(12) United States Patent
Takeda et al.

(10) Patent No.: US 11,900,835 B2
(45) Date of Patent: Feb. 13, 2024

(54) VEHICULAR DISPLAY DEVICE

(71) Applicant: KOITO MANUFACTURING CO., LTD., Tokyo (JP)

(72) Inventors: Hajime Takeda, Shizuoka (JP); Susumu Kaneko, Shizuoka (JP); Yoshiro Ito, Shizuoka (JP); Atsushi Sugimoto, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 329 days.

(21) Appl. No.: 17/297,551

(22) PCT Filed: Nov. 19, 2019

(86) PCT No.: PCT/JP2019/045288
§ 371 (c)(1),
(2) Date: May 27, 2021

(87) PCT Pub. No.: WO2020/110832
PCT Pub. Date: Jun. 4, 2020

(65) Prior Publication Data
US 2022/0013045 A1    Jan. 13, 2022

(30) Foreign Application Priority Data

Nov. 27, 2018 (JP) ................................ 2018-220840
Nov. 27, 2018 (JP) ................................ 2018-220841
Nov. 27, 2018 (JP) ................................ 2018-220842

(51) Int. Cl.
*G09F 21/04*      (2006.01)
*B60W 60/00*    (2020.01)
(Continued)

(52) U.S. Cl.
CPC ............ *G09F 21/048* (2013.01); *B60Q 1/507* (2022.05); *B60Q 1/5037* (2022.05); *B60Q 1/543* (2022.05);
(Continued)

(58) Field of Classification Search
CPC ....... G09F 21/048; G09F 19/18; B60Q 1/507; B60Q 1/503; B60Q 1/547; B60Q 1/543;
(Continued)

(56) References Cited

U.S. PATENT DOCUMENTS 9,135,842 B1    9/2015   Riley et al.
2013/0263512 A1   10/2013   Hus
(Continued)

FOREIGN PATENT DOCUMENTS

CN     102402925 A    4/2012
CN     103425197 A   12/2013
(Continued)

OTHER PUBLICATIONS

Extended European Search Report issued in corresponding European Application No. 19889147.5 dated Jul. 13, 2022 (15 pages).
(Continued)

*Primary Examiner* — Lisa S Landis
(74) *Attorney, Agent, or Firm* — Osha Bergman Watanabe & Burton LLP

(57) ABSTRACT

A vehicular display device includes at least one display panel arranged on a vehicle body of a vehicle and configured to display an image, and a display control unit configured to control display of the image. The display panel includes a movable portion provided on the vehicle body, and the display control unit includes an image control unit configured to control a display form of an image when the movable portion is operated.

18 Claims, 26 Drawing Sheets

(51) Int. Cl.
  *G05D 1/00* (2006.01)
  *G06Q 30/0242* (2023.01)
  *G06Q 30/0251* (2023.01)
  *G09F 19/18* (2006.01)
  *B60Q 1/50* (2006.01)

(52) U.S. Cl.
  CPC ......... *B60Q 1/547* (2022.05); *B60W 60/0017* (2020.02); *G05D 1/0088* (2013.01); *G06Q 30/0244* (2013.01); *G06Q 30/0246* (2013.01); *G06Q 30/0265* (2013.01); *G09F 19/18* (2013.01); *B60Q 2400/50* (2013.01); *B60W 2420/42* (2013.01)

(58) Field of Classification Search
  CPC .......... G06Q 30/0244; G06Q 30/0246; G06Q 30/0265; G09G 2300/00; G09G 2300/02; G09G 2300/023; G09G 2300/026
  See application file for complete search history.

(56) References Cited

U.S. PATENT DOCUMENTS

| | | |
|---|---|---|
| 2013/0314348 A1 | 11/2013 | Luo et al. |
| 2015/0032328 A1 | 1/2015 | Healey et al. |
| 2017/0229053 A1* | 8/2017 | Ishizuka .............. G09G 3/2003 |
| 2018/0081229 A1* | 3/2018 | Ono ..................... G09G 3/3406 |
| 2019/0197927 A1* | 6/2019 | Matsuoka ........... G09F 15/0056 |
| 2021/0341736 A1 | 11/2021 | Watanabe et al. |

FOREIGN PATENT DOCUMENTS

| | | |
|---|---|---|
| EP | 2863378 A1 | 4/2015 |
| EP | 2977291 A1 | 1/2016 |
| JP | H11-237854 A | 8/1999 |
| JP | 2012252284 A | 12/2012 |
| JP | 2015505076 A | 2/2015 |
| JP | 2015148678 A | 8/2015 |
| JP | 2016065938 A | 4/2016 |
| JP | 2019117215 A | 7/2019 |
| WO | 2017/035025 A1 | 3/2017 |
| WO | 2018/056198 A1 | 3/2018 |

OTHER PUBLICATIONS

Partial European Search Report issued in corresponding European Application No. 19889147.5 dated Mar. 24, 2022 (15 pages).

First Office Action in corresponding Chinese Application No. 201980077811.2, dated Jul. 20, 2022 (18 pages).

International Search Report issued in corresponding International Application No. PCT/JP2019/045288; dated Dec. 24, 2019 (5 pages).

Written Opinion of the International Searching Authority issued in corresponding International Application No. PCT/JP2019/045288; dated Dec. 24, 2019 (5 pages).

Second Office Action in corresponding Chinese Application No. 201980077811.2, dated Mar. 3, 2023 (22 pages).

* cited by examiner

VEHICULAR DISPLAY DEVICE

TECHNICAL FIELD

The present disclosure relates to a vehicle display device including a display panel provided on a vehicle body of a vehicle such as an automobile.

BACKGROUND ART

A vehicle is provided with a vehicular display device that displays an image of a pattern, a character, or the like on a vehicle body of an automobile in order to, for example, perform an advertisement or a promotion using the automobile or ensure traveling safety of the automobile. Patent Literature 1 proposes a technique in which a projector is installed in a side mirror or a rear lamp of an automobile, and an image is projected and displayed on an outer surface of a vehicle body panel of the automobile. Patent Literature 2 proposes a technique in which a display panel made of a transmissive organic EL display is arranged on a vehicle body panel or a window of an automobile, and an image is displayed on the display panel.

CITATION LIST

Patent Literature

Patent Literature 1: JP-A-2015-148678
Patent Literature 2: JP-A-2016-65938

SUMMARY OF INVENTION

Technical Problem

Normally, a window or a lighting device is provided on a vehicle body. However, in an automatic driving control automobile (hereinafter, referred to as an automatic driving vehicle) proposed in recent years, a window or a lighting device can be omitted, and a display device, for example, a display panel can be arranged on a vehicle body including a vehicle body panel and a window. Accordingly, it is possible to implement a vehicular display device in which a substantially entire surface of a vehicle body of an automatic driving vehicle is configured as a display surface. Further, the vehicular display device can enhance the display effect on an occupant of the automatic driving vehicle, a viewer present in the vicinity of the outside of the automatic driving vehicle (a person who sees a displayed image), or the like.

On the other hand, the vehicle body of the automatic driving vehicle is provided with a door for getting on and off. In a case where the display panel is provided on the vehicle body, an image displayed on the display panel cannot be visually recognized due to opening and closing of the door, and the display effect may be reduced. In a case of a sliding door, a part of the display panel is hidden by the door due to a sliding operation of the door, or the door itself is hidden, and an image on these display panels cannot be visually recognized. The same applies to a hinge type door. Even in a case where the vehicle body is provided with a window of an opening-closing type, an image on the display panel cannot be visually recognized due to the opening and closing of the window, and the display effect is reduced.

An object of the present disclosure is to provide a vehicular display device in which, even when a movable portion such as a door or a window provided in a vehicle body is operated, an image displayed on a display panel can be visually recognized by a viewer, and a display effect is enhanced.

In addition, in a case where a display surface is wide, when a viewer sees the display panel, the image may be difficult to see depending on a relative positional relationship between the viewer and the display panel on which the image is displayed. For example, when an image such as a small character or a symbol is displayed on the display panel, a viewer may be able to visually recognize a nearby image with a sufficient size, but a distant image may be too small to see. In addition, when a position and a direction of the display panel with respect to the viewer are changed due to the movement of the automatic driving vehicle, the image that is visually recognizable until then may not be visually recognized due to these changes. For an image with low luminance or contrast, a nearby viewer can visually recognize the image, but a distant viewer may not able to visually recognize the image.

An object of the present disclosure is to provide a vehicular display device in which, regardless of a change in a relative positional relationship between a vehicle and a viewer, an image displayed on the vehicle can be visually recognized by the viewer, and a display effect is enhanced.

In addition, the vehicular display device is easy to control a display form of an image to be displayed on the display panel. Therefore, it is conceivable that the vehicular display device controls a size of an image to be displayed according to a difference in distance between the automatic driving vehicle and a viewer (a person who sees the displayed image). An image is displayed with a large size for a viewer at a distant position, and the viewer easily visually recognizes the image. As described above, when an image with a large size is displayed, it is sufficient to use a display panel with a low resolution, and it is preferable from the viewpoint of cost.

On the other hand, when a viewer in the vicinity of the automatic driving vehicle visually recognizes an image, in particular, a character image, it is necessary to use a display panel with a high resolution in order to reduce the size of the image to an appropriate size for easy viewing and display the image. However, when a display panel with a high resolution is arranged in a wide area of the vehicle body of an automatic driving vehicle, a problem arises in that the cost of the display device is increased.

An object of the present disclosure is to provide a vehicular display device in which a display for a viewer is performed and a problem in terms of cost is eliminated.

Solution to Problem

A vehicular display device according to the present disclosure includes: at least one display panel arranged on a vehicle body of a vehicle and configured to display an image; and a display control unit configured to control display of the image, in which the display panel includes a movable portion provided on the vehicle body, and the display control unit includes an image control unit configured to control a display form of the image when the movable portion is operated.

In a preferred aspect of the present disclosure, the vehicular display device includes a plurality of display panels, and the image control unit is configured to, when an image of one display panel is hidden due to an operation of the movable portion, display the image of the one display panel on another display panel. Further, the image control unit is configured to, when the movable portion is operated, display an image different from an image displayed on the other display panel before the operation of the movable portion on the other display panel.

In the present disclosure, the movable portion is a door or a window provided on the vehicle body, and the image control unit is configured to control a display form of the image based on an opening and closing operation of the door or the window. The vehicular display device includes a plurality of display panels, and the image control unit is configured to, when the door or the window is opened or closed, control a display form of an image on one display panel to be overlapped with the door or the window, and a display form of an image on another display panel arranged on the door or the window.

A vehicular display device according to the present disclosure includes at least one display panel arranged on a vehicle body of a vehicle and configured to display an image, and a display control unit configured to control display of the image. The display control unit includes a viewer detecting unit configured to detect a viewer who is around the vehicle and visually recognizes the image and a position of the viewer, and an image control unit configured to control the image according to the position of the viewer detected by the viewer detecting unit. The image control unit is configured to control a display form of the image in response to a change in the position of the viewer.

As a preferred aspect of the present disclosure, the viewer includes a pedestrian, and the viewer detecting unit is configured to detect a pedestrian and another vehicle, and when the other vehicle is detected, determine whether the other vehicle is an automatic driving vehicle or a non-automatic driving vehicle. Further, the image control unit is configured to control a size, a display position, a shape, and brightness of the image according to a change in a position of the viewer with respect to the vehicle.

The vehicular display device according to the present disclosure further includes a projector configured to project an image onto a road surface around the vehicle, and the image control unit is configured to control display forms between display of an image on the display panel and display of an image onto a road surface by the projector.

A vehicular display device according to the present disclosure includes at least one display panel arranged on a vehicle body of a vehicle and configured to display an image, in which the display panel has a low resolution panel configured to display the image at a low resolution and a high resolution panel configured to display the image at a high resolution, and an image displayed in a display area including at least the low resolution panel is displayed in a display area of the high resolution panel.

According to the present disclosure, the high resolution panel is arranged in a part of a display area of the display panel, and the low resolution panel is arranged in a display area other than the high resolution panel. Further, an image displayed over both display areas of the low resolution panel and the high resolution panel is reduced and displayed in the display area of the high resolution panel. Alternatively, an image displayed in the display area of the low resolution panel is reduced and displayed in the display area of the high resolution panel.

Advantageous Effects of Invention

According to the vehicular display device of the present disclosure, when a movable portion such as a door or a window provided in a vehicle is operated, an image of one display panel that cannot be visually recognized due to the operation is displayed on another display panel. As a result, it is possible to provide a vehicular display device with high visual recognition effect by which the viewer can visually recognize the image reliably.

According to the present disclosure, regardless of the position of a viewer such as a pedestrian or another vehicle with respect to the vehicle, an image displayed on a display panel or a projector provided in the vehicle can be visually recognized, so that a vehicular display device with high display effect can be provided.

According to the present disclosure, it is possible to provide a vehicular display device that can be configured at a low cost while displaying to a viewer.

DESCRIPTION OF EMBODIMENTS

First Embodiment

Figure 1:
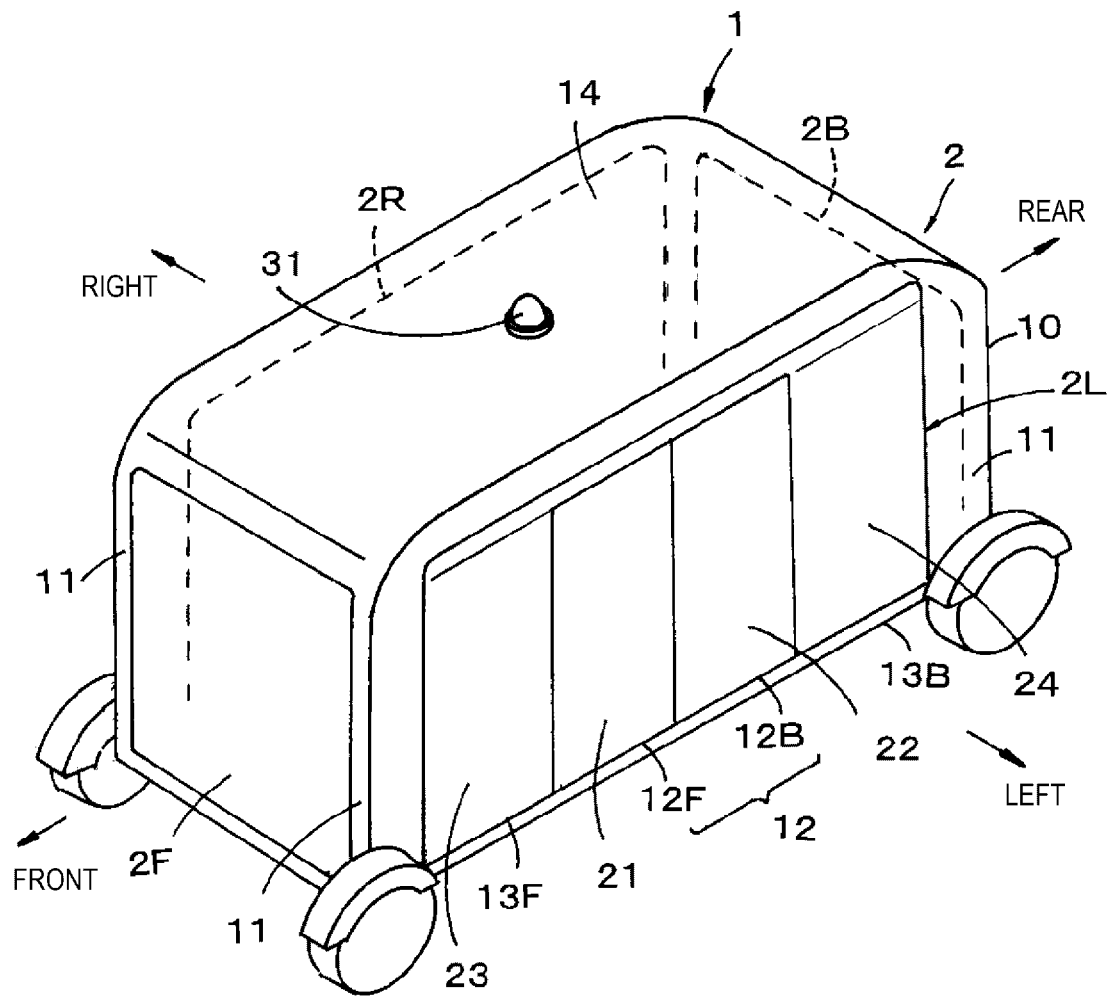
FIG. 1 is a schematic external diagram of an automatic driving vehicle according to a first embodiment.

Embodiments of the present disclosure will be described with reference to the drawings. FIG. 1 is a schematic external diagram of an automatic driving vehicle 1 according to a first embodiment to which a vehicular display device according to the present disclosure is applied. The automatic driving vehicle 1 is a four-wheel vehicle having a low floor box-shaped vehicle body (vehicle body) 10, and is automatically driven by automatic driving control. Pillars 11 provided at four corners of the vehicle body 10 are made of a rigid material. Portions of the front and rear, left and right side surfaces of the vehicle body 10 excluding the pillars 11 are made of a transparent material, or are opened so that the inside and the outside communicate with each other. Front, rear, left and right are directions indicated by arrows in FIG. 1 for convenience.

A pair of sliding doors 12 are arranged as movable portions on the left side surface of the vehicle body 10. When a front door 12F disposed on a front side is slid forward, the front door 12F is moved to a state of covering a left front side surface 13F of the vehicle body 10 adjacent to the front door 12F at the front side. Further, when a rear door 12B disposed on a rear side is slid backward, the rear door 12B is moved to a state of covering a left rear side surface 13B of the vehicle body 10 adjacent to the rear door 12B at the rear side. When the doors 12F and 12B are slid, the inside (vehicle cabin) of the vehicle body 10 is opened to the outside, and an occupant can get on or out of the automatic driving vehicle 1 or take in and out a cargo.

Display panels 2 (2F, 2B, 2L, 2R) are arranged on the four side surfaces of the vehicle body 10, that is, a front side surface, a rear side surface, the left side surface, and the right side surface, respectively, and each display panel displays a required image. In particular, the display panel 2L arranged on the left side surface includes a plurality of display panels 21, 22, 23, and 24. A front door display panel 21 is arranged on an outer surface of the front door 12F, and a rear door display panel 22 is arranged on an outer surface of the rear door 12B. A left front display panel 23 is arranged on the left front side surface 13F of the vehicle body 10, and a left rear display panel 24 is arranged on the left rear side surface 13B of the vehicle body 10.

The display panel 2 is implemented by a liquid crystal display (LCD) panel or an organic EL panel, displays an image, and can be visually recognized from the outside of the automatic driving vehicle 1. When no image is displayed on the display panel 2, the display panel 2 is in a transparent state, so that the outside can be visually recognized from the inside of the vehicle cabin of the automatic driving vehicle 1. The display panels 2 are not necessarily transparent.

A sensor 31 is arranged in an upper portion of the vehicle body 10. The sensor 31 is arranged in an upper portion of a roof 14 of the vehicle body 10. The sensor 31 is implemented by an imaging camera having an imaging element such as a CCD or a MOS, or a light detection and ranging (LiDAR), and can detect a person present around the automatic driving vehicle 1. The sensor 31 may be configured using a sensor for other vehicle detection or road condition detection provided for the automatic driving control.

Figure 2:
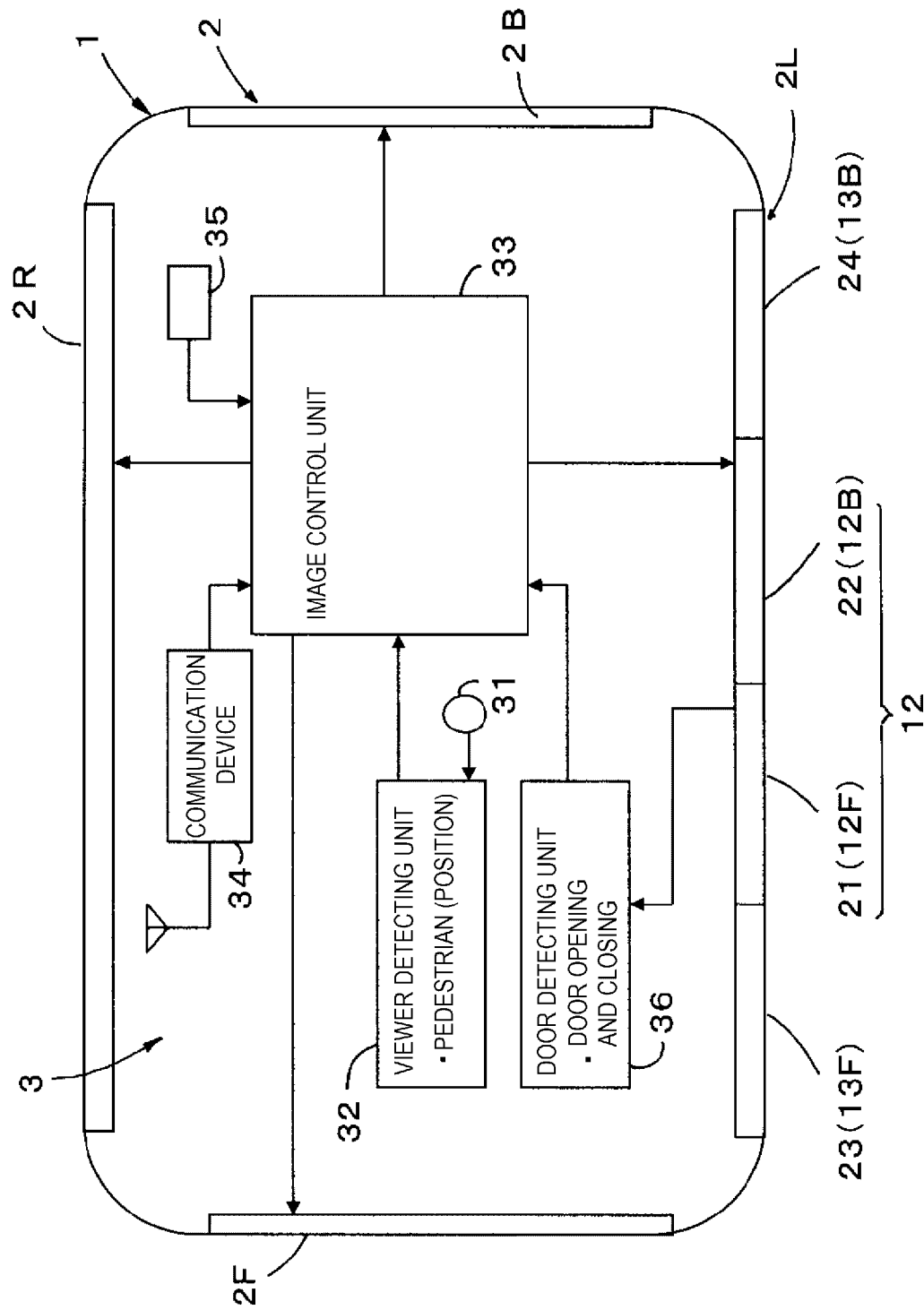
FIG. 2 is a block diagram of a display control unit according to the first embodiment.

FIG. 2 is a block configuration diagram of a display control unit 3 that controls the display panels 2. The display control unit 3 includes a viewer detecting portion 32 in addition to the sensor 31. Based on the output of the sensor 31, the viewer detecting portion 32 detects, in particular, a person who is present on the left side of the automatic driving vehicle 1 and is in a state of visually recognizing the display panel 2L on the left side surface, and detects a position of the detected person, in particular, a position of the person with respect to the automatic driving vehicle 1 at the same time.

The display control unit 3 includes a door detecting unit 36 that detects an open and closed state of the door 12. The door detecting unit 36 is configured as a movable detection unit that detects the open and closed state of the door 12. This open and closed state includes information on an opening and closing movement position and an opening and closing state of the door 12.

The display control unit 3 includes an image control unit 33 that controls a display form of an image to be displayed on the display panel 2. A communication device 34 that is wirelessly connected to a base station, another vehicle, the Internet, or the like is connected to the image control unit 33, data related to a display image is input via the communication device 34, and an image corresponding to the input data is displayed on the display panel 2. An input unit 35 is connected to the image control unit 33, and an image corresponding to data input by an occupant of the vehicle to the input unit 35 is displayed on the display panel 2.

The image to be displayed based on the data is an advertisement image for promotion, a sign image such as a road sign, a character image such as a message for communication, and an image such as a symbol. The image may be either a still image or a moving image. The image may be a monochrome image or a color image.

The image control unit 33 executes display control of the display panel 2L on the left side surface based on a viewer detected by the viewer detecting portion 32 and the open and closed state of the door detected by the door detecting unit 36. As the display control, the image control unit 33 controls a display form of an image to be displayed on the display panel 2L on the left side surface based on position information of the detected viewer.

Figure 3A:
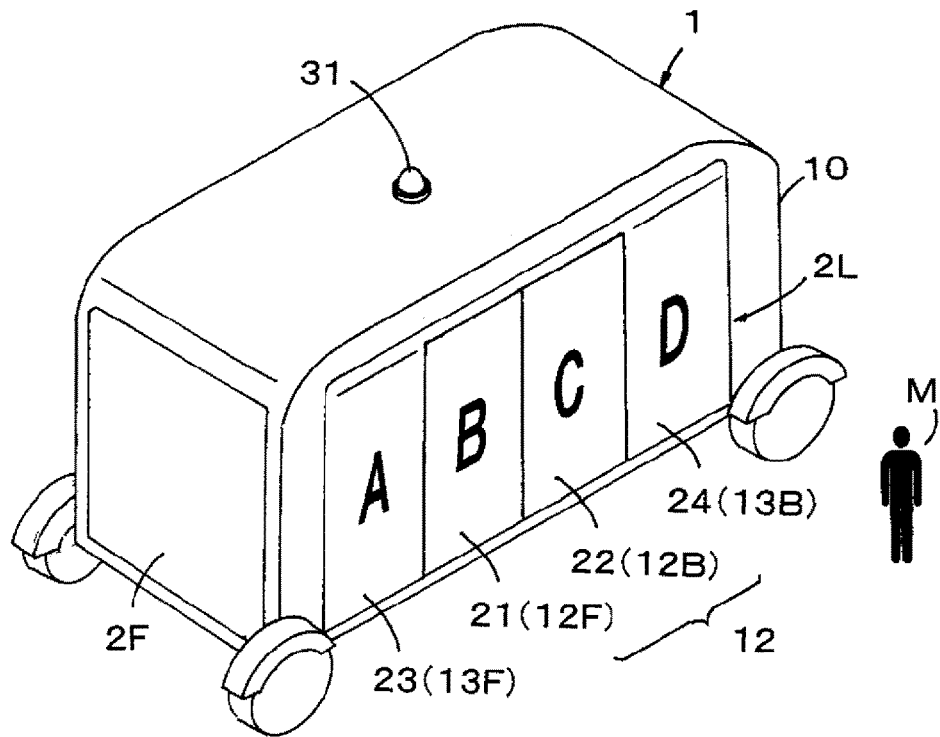
FIG. 3A is a schematic external diagram showing an image display form according to the first embodiment.
Figure 3B:
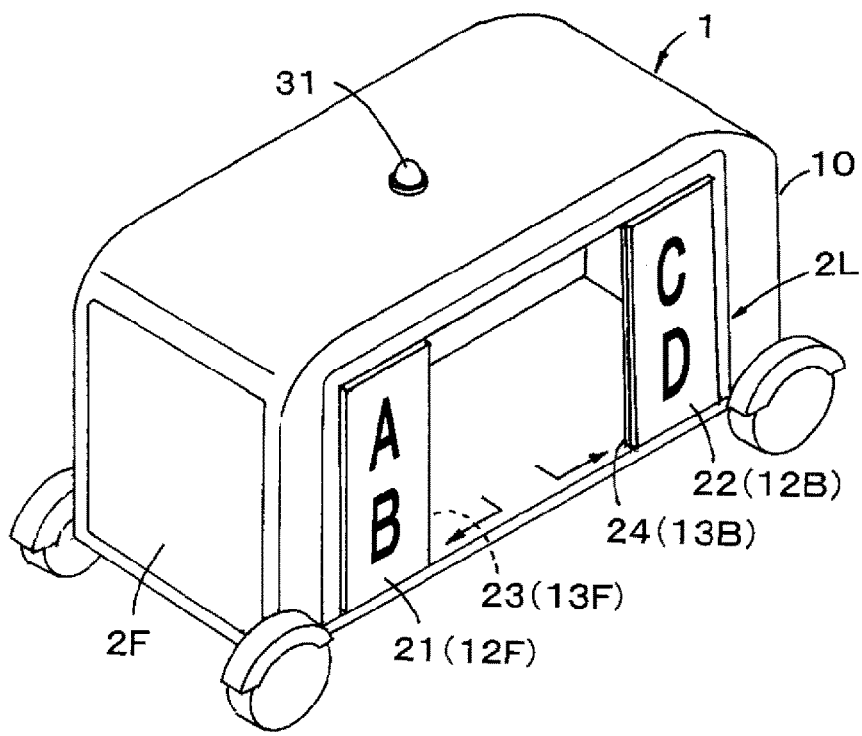
FIG. 3B is a schematic external diagram showing an image display form according to the first embodiment.

Control of the display form of an image on the display panel 2 in the automatic driving vehicle 1 including the vehicular display device will be described. FIGS. 3A and 3B are schematic external views for explaining the control of the display form, and show a state in which the automatic driving vehicle 1 is parked. As shown in FIG. 3A, when the viewer detecting portion 32 detects a viewer (person) M, the viewer detecting portion 32 detects position information of the viewer. The image control unit 33 displays a required image based on the data from the communication device 34 or the input unit 35 on the display panel on a side where the detected viewer M exists. In this example, since the viewer M is detected on the left side of the automatic driving vehicle 1, the image control unit 33 displays an image on the display panel 2L on the left side surface.

When the door detecting unit 36 detects that the door 12 of the automatic driving vehicle 1 is closed, the image control unit 33 displays the image on the entire surface of the display panel 2L on the left side surface, that is, on the display panels 21 to 24. In FIG. 3A, an image of "ABCD" is displayed on each of the display panels 21 to 24. When there is a margin of the display space on the display panel, the image can be enlarged and displayed, and a distant viewer M can easily confirm the image.

On the other hand, as shown in FIG. 3B, when the door 12 of the automatic driving vehicle 1 is open, the door detecting unit 36 detects that the door 12 is opened, and the image control unit 33 changes a display form of the display panel 2L on the left side surface according to the detection output of the door detecting unit 36. That is, the front door 12F slides forward and is moved to a position covering the left front side surface 13F, and the rear door 12B slides rearward and is moved to a position covering the left rear side surface 13B. As a result, the left front display panel 23 is covered by the front door 12F, the left rear display panel 24 is covered by the rear door 12B, and images displayed on the left front display panel 23 and the left rear display panel 24 are hidden.

The image control unit 33 displays the image displayed on the left front display panel 23 on the front door display panel 21. In this example, the image "A" displayed on the left front display panel 23 is combined with the image "B" displayed on the front door display panel 21, and the image "AB" is displayed on the front door display panel 21. Similarly, for the left rear display panel 24, the image "D" displayed on the left rear display panel 24 is combined with the image "C" displayed on the rear door display panel 22, and the image "CD" is displayed on the rear door display panel 22.

When there is no margin of the display space on the display surfaces of the front and rear door display panels 21 and 22, each image may be reduced and displayed. Scroll display may be performed in which an image is displayed while being moved in a front-rear direction. When only one of the front and rear doors 12F and 12B is opened, the image control may be executed only on one of the display panels 21 and 22 corresponding to the door. For example, when only the front door 12F is opened, an image on the front door display panel 21 of the front door 12F is moved, but a display state of an image on the rear door display panel 22 of the rear door 12B may be maintained.

In this way, even when the front and rear doors 12 are opened, and the display panels 23 and 24 on the left side surface are covered by the doors 12, the images of the hidden display panels 23 and 24 are moved to the door display panels 21 and 22 and displayed, so that the viewer can visually recognize the images continuously. As a result, the display effect on the display panel 2L can be improved.

Figure 4:
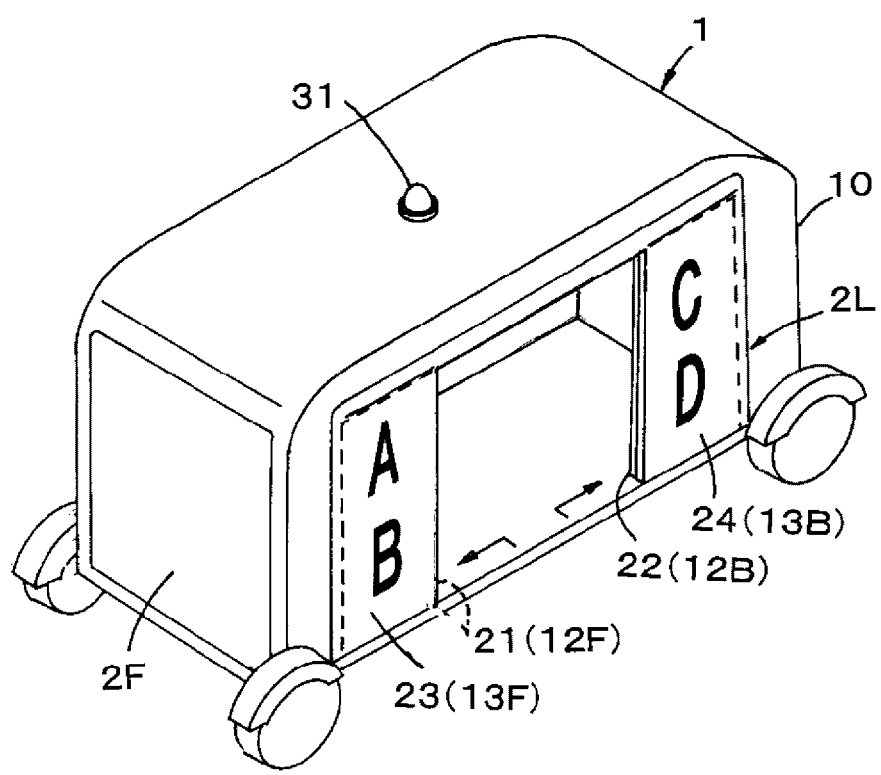
FIG. 4 is a schematic external diagram showing a modification of the first embodiment.

FIG. 4 is a schematic external diagram showing a modification of a display control form of an image. In FIG. 4, when the front door 12F and the rear door 12B are slid and opened, the front door 12F and the rear door 12B are accommodated inside the left front display panel 13F and the left rear display panel 13B, respectively. Therefore, when the doors 12F and 12B are opened, the front door display panel 21 is covered by the left front display panel 23, and the rear door display panel 22 is covered by the left rear display panel 24.

The image control unit 33 displays the image displayed on the front door display panel 21 on the left front display panel 23. In this example, the image "B" displayed on the front door display panel 21 is combined with the image "A" displayed on the left front display panel 23, and the image "AB" is displayed on the left front display panel 23. Similarly, for the rear door display panel 22, the image "C" displayed on the rear door display panel 22 is combined with the image "D" displayed on the left rear display panel 24, and the image "CD" is displayed on the left rear display panel 24.

When there is no margin of the display space on the display surfaces of the front and rear display panels 23 and 24 on the left side, each image may be reduced and displayed or may be scrolled and displayed. Further, when only one of the front and rear doors 12F and 12B is opened, the image control may be executed only on one of the display panels corresponding to the door.

Second Embodiment

Figure 5A:
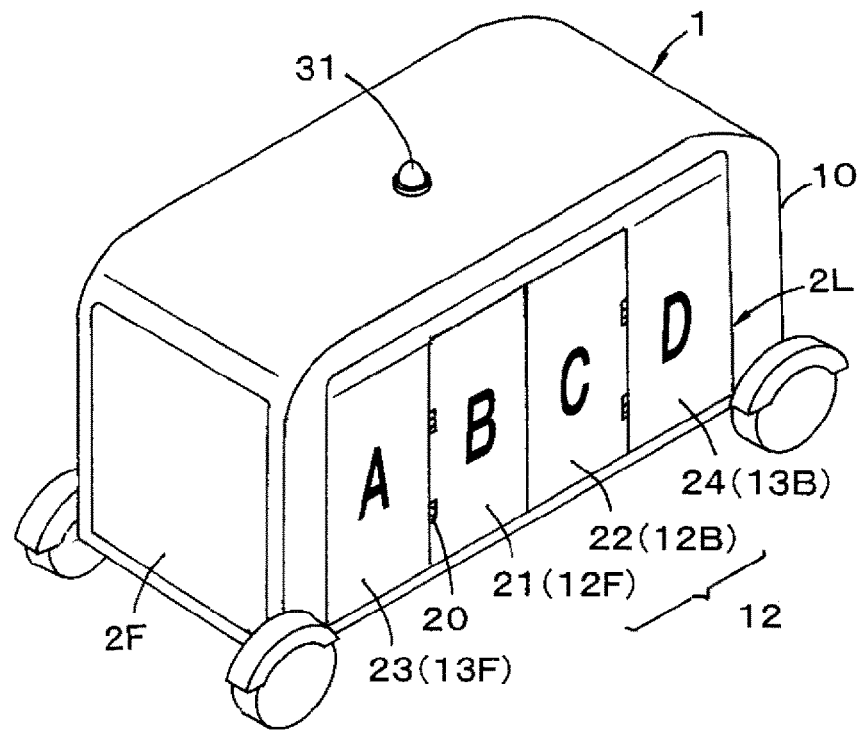
FIG. 5A is a schematic external diagram showing an automatic driving vehicle and an image display form thereof according to a second embodiment.
Figure 5B:
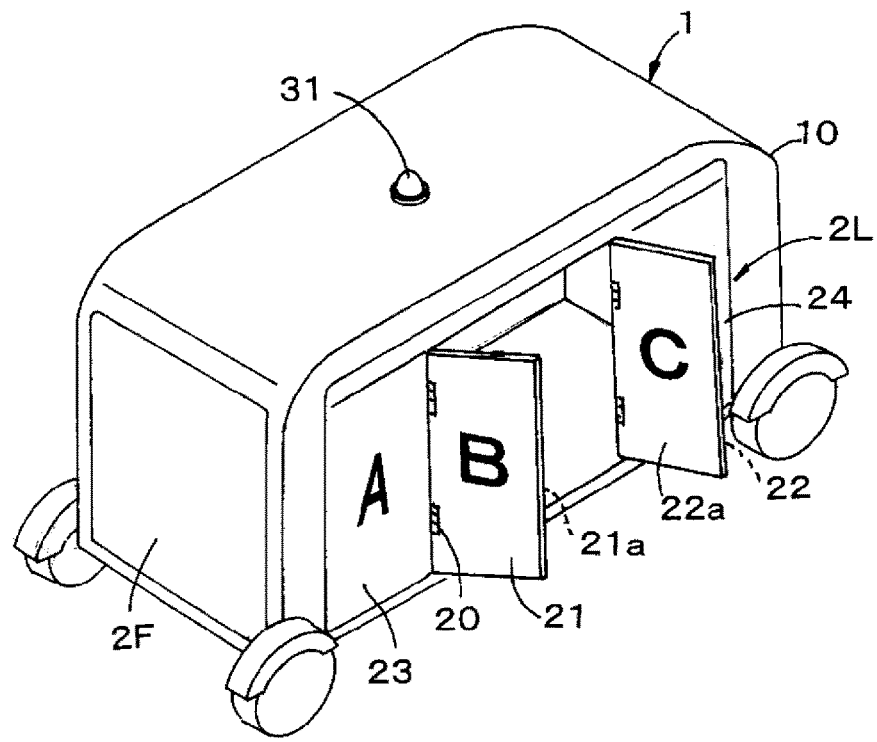
FIG. 5B is a schematic external diagram showing the automatic driving vehicle and an image display form thereof according to the second embodiment.

FIGS. 5A and 5B are schematic external diagrams of an automatic driving vehicle according to a second embodiment. As shown in FIG. 5A, in the automatic driving vehicle 1, on the left side surface of the vehicle body 10, a pair of double-door hinge-type doors 12 that are rotated around hinges 20 as a fulcrum point are arranged. When the front door 12F disposed on the front side is fully opened forward, the front door 12F is in a state of covering the left front side surface 13F of the vehicle body 10 adjacent to the front door 12F at the front side. When the rear door 12B disposed on the rear side is fully opened rearward, the rear door 12B is in a state of covering the left rear side surface 13B adjacent to the rear door 12B at the rear side.

On the left side surface, as in the first embodiment, as the display panel 2L on the left side surface, the front door display panel 21 is arranged on the outer surface of the front door 12F, and the rear door display panel 22 is arranged on the outer surface of the rear door 12B. The left front display panel 23 is arranged on the left front side surface 13F, and the left rear display panel 24 is arranged on the left rear side surface 13B. In FIGS. 5A and 5B, a front door inner display panel 21a and a rear door inner display panel 22a are arranged on inner surfaces of the front door 12F and the rear door 12B, respectively.

As the control of the display form of an image on the display panels 2L in the automatic driving vehicle 1 according to the second embodiment, when the door 12 is closed, the image control unit 33 displays an image on the entire surface of the display panels 2L on the left side surface, similarly to the display form described above. That is, images are displayed on the front door display panel 21, the rear door display panel 22, the left front display panel 23, and the left rear display panel 24. In FIGS. 5A and 5B, for example, an image "ABCD" is displayed.

As shown in FIG. 5B, when the door 12 of the automatic driving vehicle 1 is opened, the door detecting unit 36 shown in FIG. 2 detects that the door 12 is opened. Until the door 12 is opened by a predetermined angle or more, the image control unit 33 maintains the display of the image. For example, in FIG. 5B, since an opening angle of the front door 12F is small, the image "B" is displayed on the front door display panel 21. As a result, the viewer can visually recognize the image "A" on the left front display panel 23 and the image "B" on the front door display panel 21.

On the other hand, when the door is opened by a predetermined angle or more, the control of changing the display of the image is executed. For example, in FIG. 5B, an opening angle of the rear door 12B increases, and an inner surface of the rear door 12B faces outward. When the door detecting unit 36 detects this state, the image control unit 33 displays the image displayed on the rear door display panel 22 on the rear door inner display panel 22a. In this example, the image "C" displayed on the rear door display panel 22 is displayed on the rear door inner display panel 22a. As a result, the viewer can visually recognize the image of the rear door 12B.

When the rear door 12B is in a state close to a fully opened state, the left rear display panel 24 is covered by the rear door 12B. In this case, the image control unit 33 displays an image displayed on the left rear display panel 24 on the rear door inner display panel 22a. The image control unit 33 combines the image "D" displayed on the left rear display panel 24 and the image "C" displayed on the rear door display panel 22, and displays the image "CD" on the rear door inner display panel 22a.

In this way, even when the front and rear hinge-type doors 12F and 12B are opened, the display panels 21 and 22 of the doors 12F and 12B face inward and cannot be visually recognized, and the display panels 23 and 24 on the left side surface are covered by the doors 12F and 12B and cannot be visually recognized, according to the present embodiment, images on the display panels 21 and 22 are displayed on the door inner display panels 21a and 22a, and a viewer can visually recognize the image to obtain information. As a result, the display effect on the display panel can be improved.

In the second embodiment, a door control unit that controls an opening angle of the door 12 (the front door 12F and the rear door 12B) may be provided. When the viewer detecting portion 32 detects a position of a viewer, the door control unit controls an angle of the door 12 so that any one of the door display panels 21 and 22 on the outer surface of the door 12 and the door inner display panels 21a and 22a on the inner surface of the door faces the front of the detected viewer. In the present embodiment, an image is displayed on the display panel in a state where the display panels 21, 21a, 22, and 22a of the door 12 are oriented toward the front of the viewer, so that the viewer can visually recognize the image, and the display effect can be further improved.

Third Embodiment

Figure 6A:
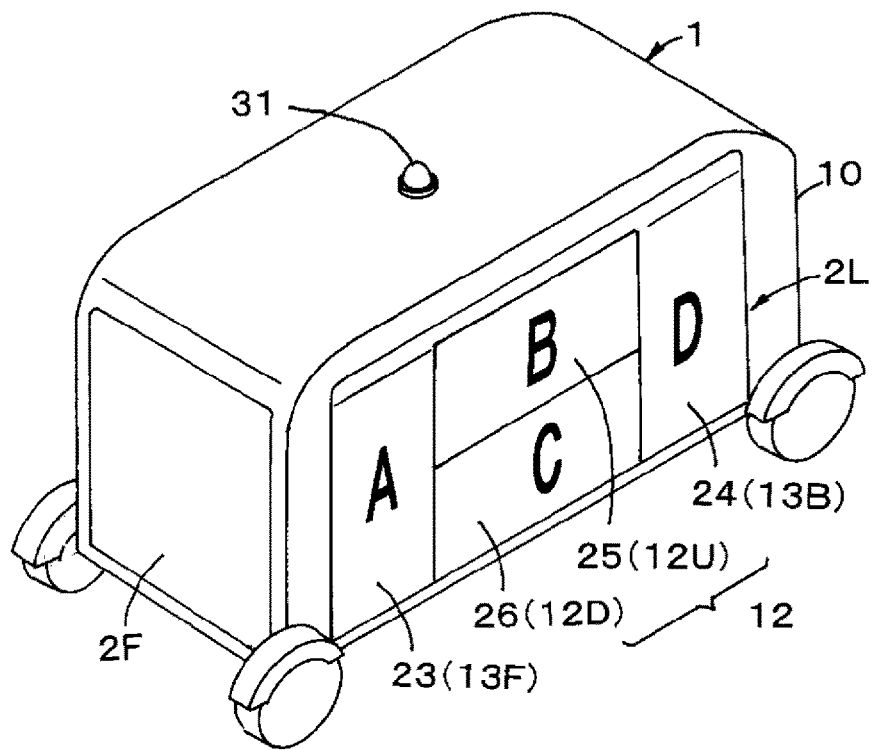
FIG. 6A is a schematic external diagram showing an automatic driving vehicle and an image display form thereof according to a third embodiment.
Figure 6B:
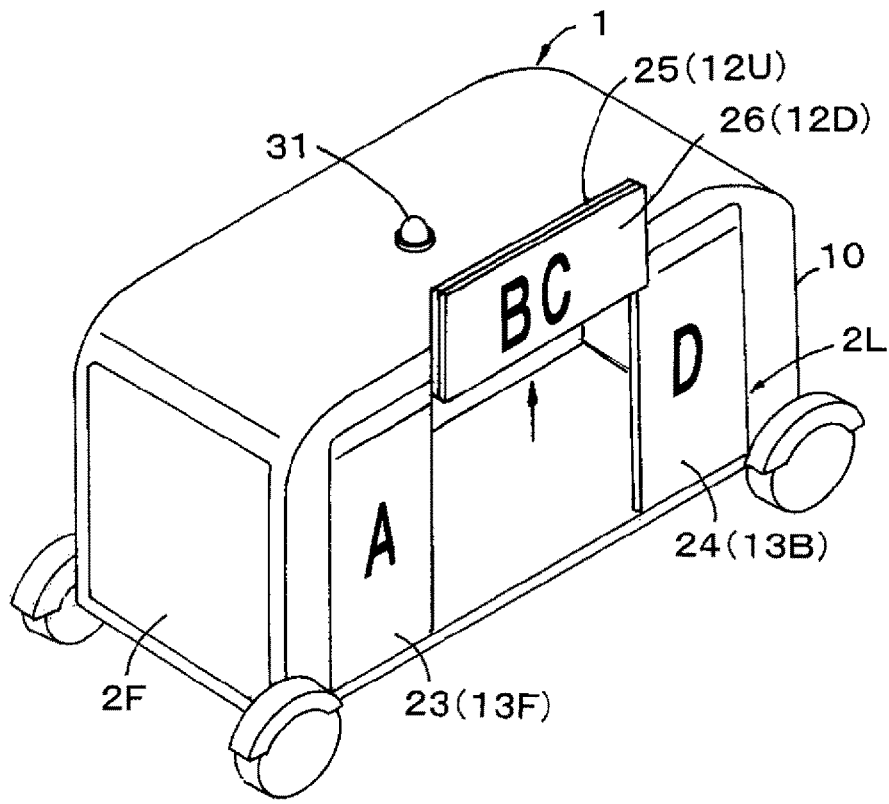
FIG. 6B is a schematic external diagram showing the automatic driving vehicle and an image display form thereof according to the third embodiment.

FIGS. 6A and 6B are schematic external diagrams of an automatic driving vehicle according to a third embodiment. As shown in FIG. 6A, a sliding door 12 that slides up and down to be opened and closed is arranged on the left side surface of the vehicle body 10 in the automatic driving vehicle 1. That is, the door 12 includes an upper door 12U to be slid with respect to the vehicle body 10, and a lower door 12D to be slid with respect to the upper door 12U. When the doors 12U, 12D are moved to an upper position of the roof 14, the opening of the vehicle body 10 is opened. The lower door 12D is positioned in front of the upper door 12U.

The door display panels 25 and 26 are arranged on outer surfaces of the doors 12U and 12D, respectively. As in the first and second embodiments, the left front display panel 23 is arranged on the left front side surface of the vehicle body 10 and the left rear display panel 24 is arranged on the left rear side surface of the vehicle body 10, so as to sandwich the doors 12U, 12D in the front-rear direction.

As the control for the display form of the image of the display panel in the automatic driving vehicle 1 according to the third embodiment, when the door detecting unit 36 detects that the door 12 is closed, the image control unit 33 displays the images "B" and "C" respectively on the door display panels 25 and 26 of the upper door 12U and lower door 12D, and displays the images "A" and "D" on the left front display panel 23 and the left rear display panel 24, respectively. In FIGS. 6A and 6B, for example, an image "ABCD" is displayed.

As shown in FIG. 6B, when the upper door 12U and the lower door 12D are slid upward and moved above the roof 14, the door 12 is opened, and the door detecting unit 36 detects that the door 12 is opened. In response to the detection output of the door detecting unit 36, the image control unit 33 maintains the images "A" and "D" displayed on the left front display panel 23 and the left rear display panel 24 as they are. The images "B" and "C" displayed on the door display panels 25 and 26 are displayed side by side on the door display panel 26 in the front. As a result, the viewer can easily visually recognize the image of the door display panel, and can improve the display effect of the display panel with respect to the viewer.

Figure 7:
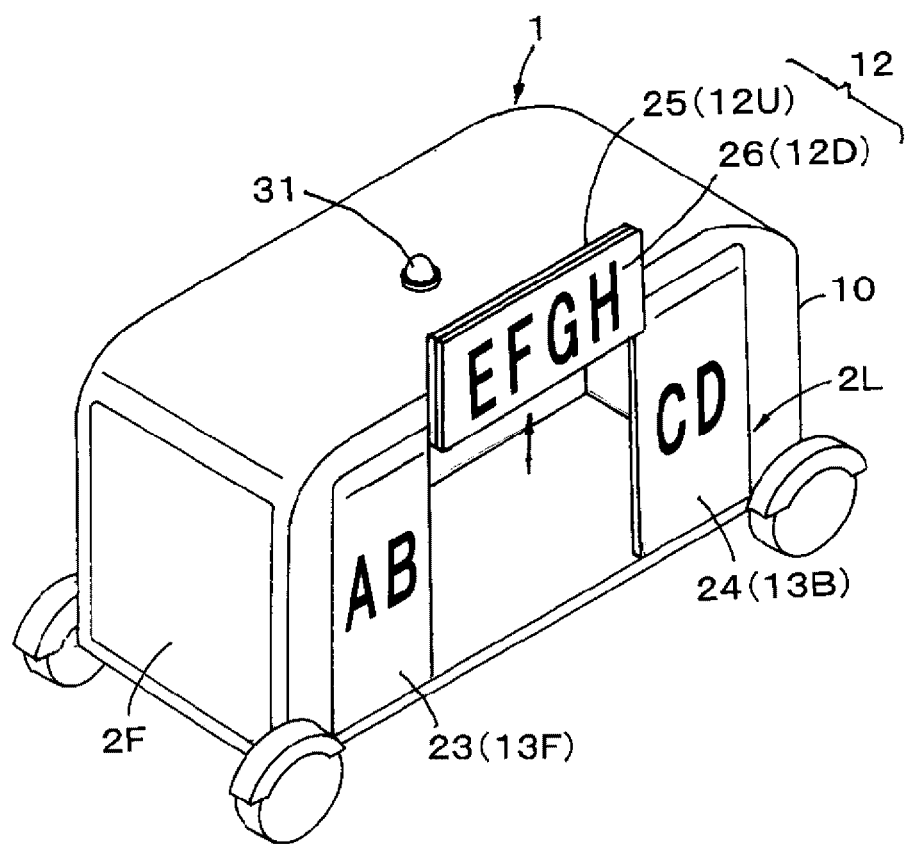
FIG. 7 is a schematic external diagram showing a modification of the third embodiment.

As shown in the schematic external diagram of FIG. 7, when the door 12 is opened, the images "B" and "C" of the door display panels 25 and 26 may be respectively displayed on the left front display panel 23 and the left rear display panel 24 together with the images "A" and "D". When such an image display control is performed, another image "EFGH" can be displayed on the door display panel 26 moved upward. The image "EFGH" may display, for example, an image such as a signboard of a service performed by the automatic driving vehicle, an advertisement, or a promotion. Alternatively, the image "EFGH" may display an image of a road sign or other signs. In this way, the door display panel can be effectively used, and the display effect of the display panel with respect to the viewer can be improved.

Fourth Embodiment

Figure 8A:
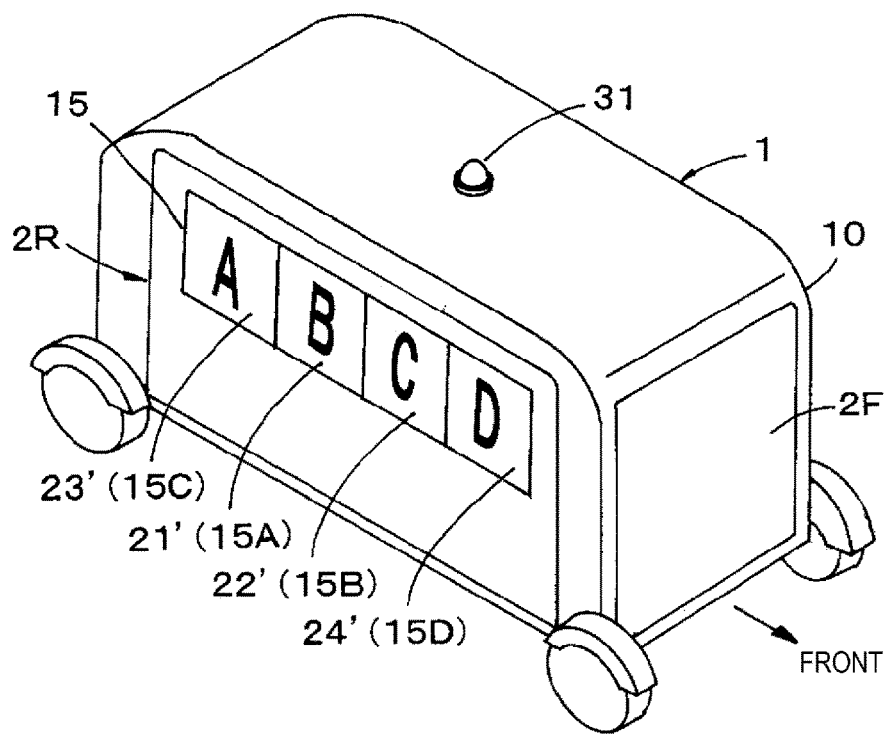
FIG. 8A is a schematic external diagram showing an automatic driving vehicle and an image display form thereof according to a fourth embodiment.
Figure 8B:
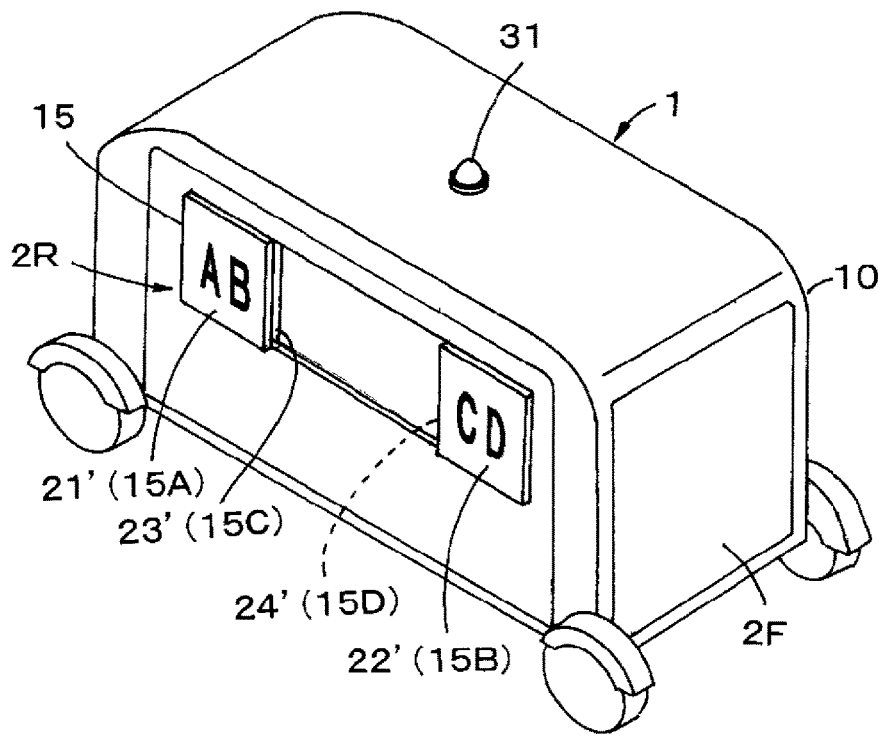
FIG. 8B is a schematic external diagram showing the automatic driving vehicle and an image display form thereof according to the fourth embodiment.

FIGS. 8A and 8B are schematic external diagrams of an automatic driving vehicle 1 according to a fourth embodiment as viewed from a right side surface side. In the automatic driving vehicle 1, four windows 15 are arranged side by side in a horizontal direction on the right side surface of the vehicle body 10. There are fixed windows 15C, 15D arranged on the left and right, and slide windows 15A, 15B to be slid to the left and right respectively. Display panels 21' to 24' configuring a right side surface display panel 2R are arranged on the outer surfaces of the windows 15A to 15D, respectively.

A required image is displayed on the display panels 21' to 24' by the image control unit 33. In FIGS. 8A and 8B, the image "ABCD" is displayed on the display panels 21' to 24' from the left. During stopping or traveling of the automatic driving vehicle 1, when the slide windows 15A and 15B are opened and overlap the front side of the fixed windows 15C and 15D respectively, the images "C" and "D" displayed on the display panels 23' and 24' of the fixed windows 15C and 15D cannot be visually recognized.

The image control unit 33 displays the images "C" and "D" of the display panels 23' and 24', which are overlapped and cannot be visually recognized, on the display panels 21' and 22' of the slide windows 15A and 15B. As a result, the image "ABCD" is displayed on the display panels 21' and 22', the viewer can visually recognize all the images displayed before the window is opened, and the display effect of the display panel with respect to the viewer can be improved.

A window detection unit may be provided in the display control unit 3 shown in FIG. 2. An open and closed state of the window 15 is detected by the window detection unit, and an image to be displayed on the display panels 21' to 24' of the windows 15 may be controlled based on a detection output of the window detection unit.

In the first to fourth embodiments described above, the display form of an image on the display panel arranged on the outer surface of the vehicle body of the automatic driving vehicle is described. The present disclosure can be similarly applied to an automatic driving vehicle in which a display panel is arranged on an inner surface of a vehicle body, that is, an inner side surface of a vehicle cabin, and a viewer visually recognizes an image displayed on the display panel in the vehicle cabin.

For example, in a case where the display panels are arranged on respective inner wall surfaces of a door and the vehicle cabin, when the door is opened, an image displayed on the display panel overlapping the door cannot be visually recognized by the viewer in the vehicle cabin. The image displayed on the hidden display panel is displayed on another display panel, so that the viewer can visually recognize the image.

In the fourth embodiment, in a case where the display panels are arranged on the inner surfaces of the windows respectively, when a window is opened, since the windows overlap each other, the display panel of one of the windows is covered with the other window, and the viewer in the vehicle cabin cannot visually recognize the image. The image displayed on the hidden display panel is displayed on another display panel, so that the viewer can visually recognize the image.

In the second to fourth embodiments, when the image of a hidden display panel is displayed on another display panel, if there is no margin of the display space for displaying these images on the display panel, the image may be reduced and displayed or may be scrolled and displayed in the same manner as in the first embodiment.

The automatic driving vehicle according to the embodiments can be applied to public transportation, for example, a bus. The display control according to the present disclosure is applied to an image displayed during traveling of the bus when the door is opened and closed since the bus stops at a bus stop and a passenger gets on and off.

The image control unit 33 according to the present disclosure may control not only a display position of an image, but also a size of an image, and a change in the shape and brightness of an image (including the luminance, the color saturation, and the contrast). An image to be displayed may be a moving image.

In the embodiments, an example is shown in which as the viewer, a person, in particular, a pedestrian is targeted. The viewer in the present disclosure may be a person in another vehicle. Further, in the first to fourth embodiments, a form in which an image is displayed when a viewer is detected is described. However, it is also possible to perform display control of an image without detecting the presence of a viewer. A configuration may be adopted in which an occupant of an automatic driving vehicle or an external human performs display control of an image by manual control through the input unit without detecting opening and closing of a door or a window. For example, display control may be performed by a portable communication device such as a smart phone.

Fifth Embodiment

Figure 9:
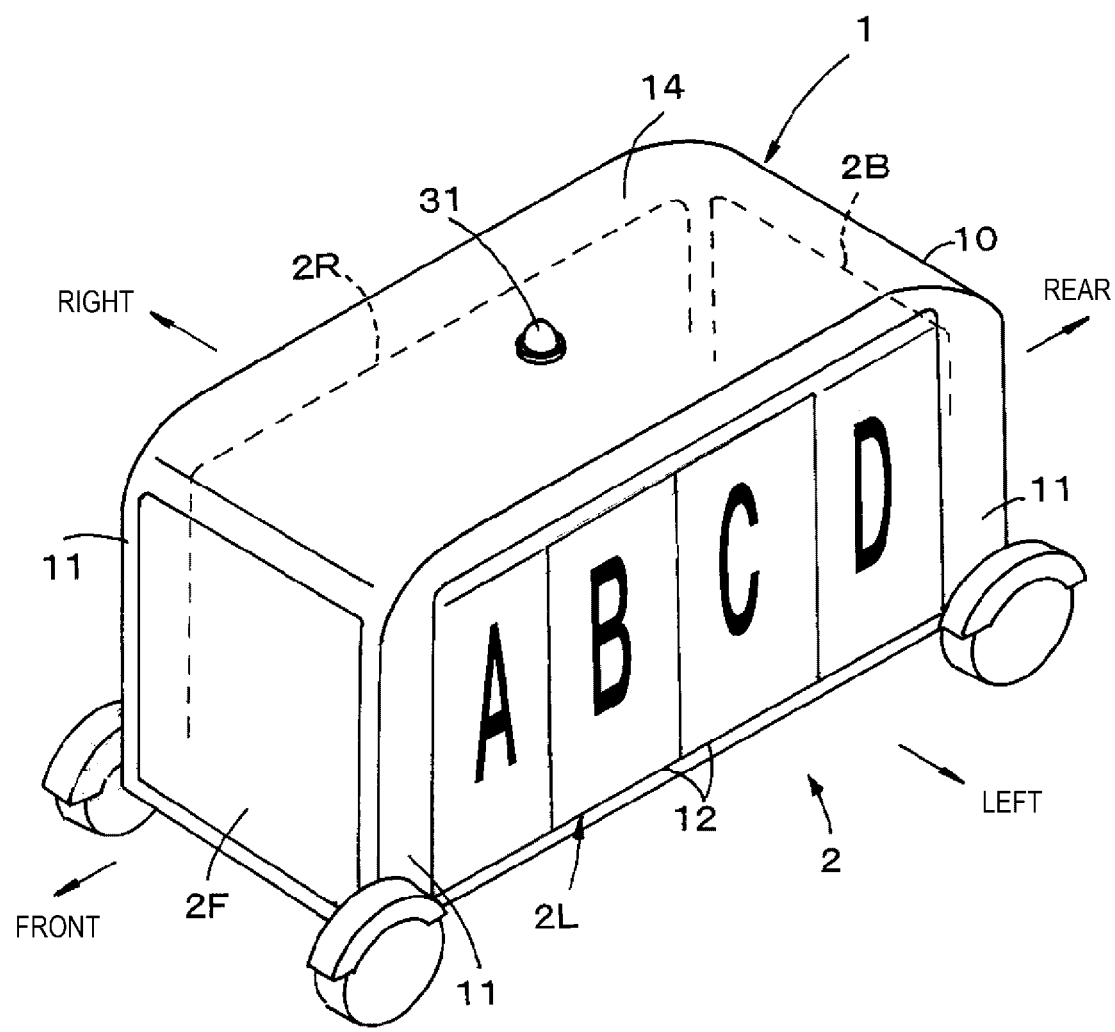
FIG. 9 is a schematic external diagram of an automatic driving vehicle according to a fifth embodiment.

FIG. 9 is a schematic external diagram of an automatic driving vehicle according to a fifth embodiment to which a vehicular display device according to the present disclosure is applied.

A pair of slide doors 12 are arranged on the left side surface of the four side surfaces of the vehicle body 10. The slide door 12 is also preferably made of a transparent material or formed in a frame shape through which the inside and the outside communicate with each other.

The display panels 2 (2F, 2B, 2L, 2R) are arranged on the front side surface and the rear side surface, as well as the left side surface and the right side surface of the vehicle body 10. In particular, on the left side surface, the pair of slide doors 12 and the display panel 2 (2L) are arranged at portions on the left side surface other than the slide doors 12. All four side surfaces of the vehicle body 10 are configured as the display panels 2.

The sensor 31 is arranged on the roof 14 of the vehicle body 10. The sensor 31 can detect a pedestrian and another vehicle existing around the front, rear, left and right of the automatic driving vehicle 1. The sensor 31 may be configured using a sensor for other vehicle detection or road condition detection provided for the automatic driving control.

Figure 10:
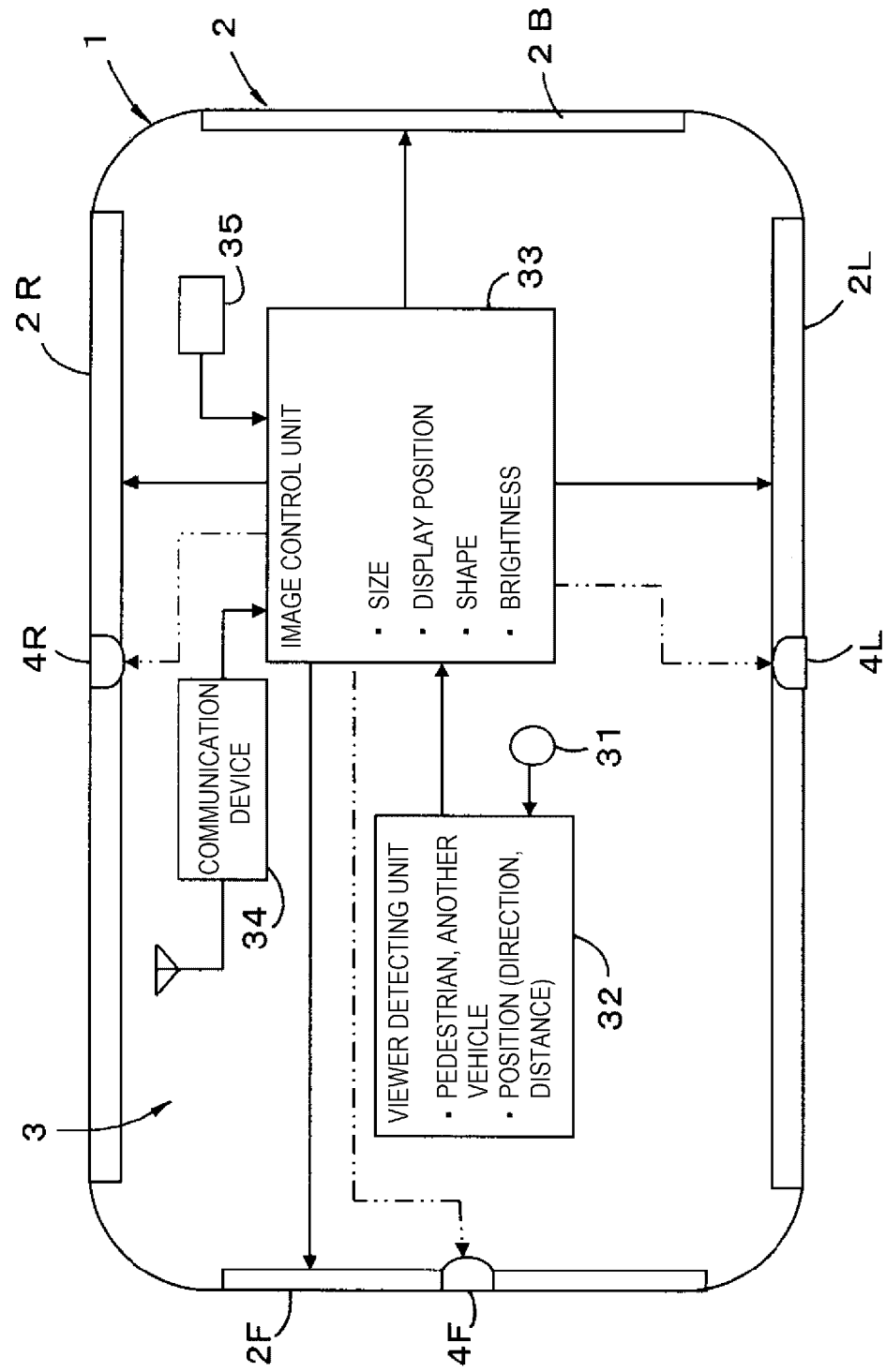
FIG. 10 is a block diagram of a display control unit according to the fifth embodiment.

FIG. 10 is a block configuration diagram of a display control unit 3 that controls the display panels 2. The display control unit 3 includes the viewer detecting portion 32 and the image control unit 33 in addition to the sensor 31. The viewer detecting portion 32 detects a viewer, that is, a pedestrian or another vehicle that visually recognizes the display panel 2 of the vehicle based on the output of the sensor 31. The sensor 31 and the viewer detecting portion 32 configure a viewer detecting unit according to the present disclosure. In the other vehicle to be detected, an occupant of the other vehicle becomes a viewer. When the other vehicle is detected, the viewer detecting portion 32 determines whether the other vehicle is an automatic driving vehicle or a non-automatic driving vehicle (a manual driving vehicle). Further, the position information on the detected pedestrian and the other vehicle, that is, a direction and a distance in which the pedestrian or the other vehicle is present with respect to the automatic driving vehicle 1, for example, the position and the distance of the pedestrian and the other vehicle in any one of the front, rear, left, and right of the vehicle, is detected.

In the detection of the position information, a moving speed and a moving direction of the automatic driving vehicle (hereinafter, referred to as the own vehicle) 1 may be detected and referred to, so that a relative moving speed and a relative moving direction of the detected pedestrian and the other vehicle with respect to the own vehicle may be detected. By this detection, the viewer detecting portion 32 can determine whether the pedestrian and the other vehicle are stationary or moving on the road, and can also determine the direction and the speed when the pedestrian and the other vehicle are moving.

The image control unit 33 controls the display form of the image to be displayed on the display panel 2 based on the position of the viewer detected by the viewer detecting portion 32.

The image control unit 33 executes display control for allowing the viewer detected by the viewer detecting portion 32 to easily visually recognize the image displayed on the display panel 2. As the display control, the image control unit 33 controls a form of an image to be displayed on the display panel 2, that is, a display position, a size, a shape, and brightness of the image on the display panel 2, based on the position information such as the direction and distance of the detected viewer.

The automatic driving vehicle (own vehicle) 1 including the vehicular display device can display a required image on the display panels 2 (2F, 2B, 2L, 2R) arranged on the front, rear, left, and right side surfaces of the vehicle body 10. In FIG. 9, a character image "ABCD" (hereinafter, simply referred to as an image) is displayed on the display panel on the left side surface. The automatic driving vehicle (own vehicle) 1 controls the form of a displayed image on each of the display panels 2F, 2B, 2L, and 2R or between the display panels 2F, 2R, 2L, and 2R. Hereinafter, a representative form of displaying an image on the display panel will be described.

(First Display Control Form of Fifth Embodiment)

Figure 11A:
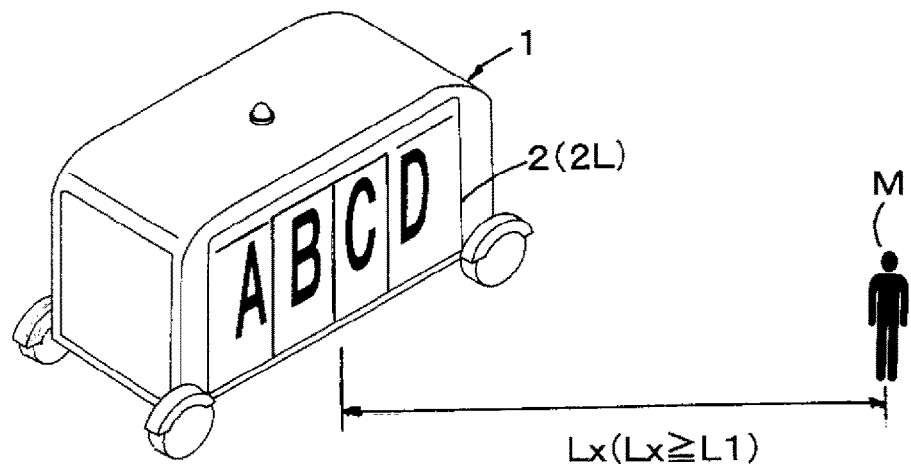
FIG. 11A is a schematic external diagram of a first display control form according to the fifth embodiment.
Figure 11B:
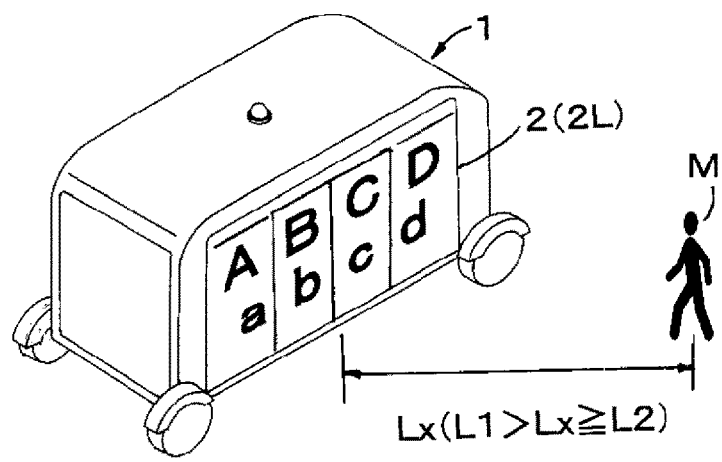
FIG. 11B is a schematic external diagram of the first display control form according to the fifth embodiment.
Figure 11C:
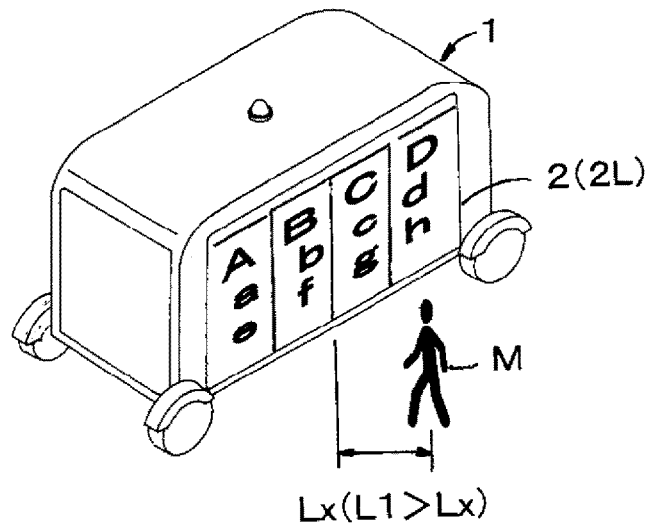
FIG. 11C is a schematic external diagram of the first display control form according to the fifth embodiment.

FIGS. 11A, 11B, and 11C are schematic external diagrams of a first display control form. In FIGS. 11A, 11B, and 11C, the automatic driving vehicle (own vehicle) 1 is parked or stopped, and a pedestrian M as a viewer is present in the vicinity of the own vehicle 1. When the viewer detecting portion 32 of the own vehicle 1 detects the pedestrian M, the viewer detecting portion 32 detects position information of the pedestrian M. On the other hand, the image control unit 33 displays a required image on the display panel 2 based on the data from the communication device 34 or the input unit 35. Then, the image control unit 33 controls the image so that the image displayed on the display panel 2 is displayed in a form most easily visible to the pedestrian M as follows.

In FIG. 11A, the viewer detecting portion 32 detects a distance Lx between the pedestrian M and the own vehicle 1 in the direction of the left side surface of the own vehicle 1, and compares the distance Lx with a reference distance. In FIG. 11A, the viewer detecting portion 32 detects that the detected distance Lx is equal to or greater than a first reference distance L1. In response to a signal of the viewer detecting portion 32, the image control unit 33 displays the image "ABCD" on the display panel 2L on the left side surface, which is the side where the pedestrian M is present, for example, on the display panel 2L divided into four parts including the slide doors 12. At this time, in view of the fact that the distance Lx is equal to or greater than the first reference distance L1, the image "ABCD" is displayed as large as possible. As a result, the pedestrian M at a position farther from the own vehicle 1 than the first reference distance L1 can visually recognize and confirm the image.

In FIG. 11B, the viewer detecting portion 32 detects that the pedestrian M is approaching the left side surface of the own vehicle 1. When the distance Lx is shorter than the first reference distance L1 and is equal to or greater than a second reference distance L2 smaller than the first reference distance L1, the image control unit 33 reduces the size of the image "ABCD" to be displayed. At this time, the image is reduced to a size that can be visually recognized by the pedestrian M present at the distance Lx. The own vehicle 1 may display another image, for example, "abcd" in an available display space of the display panel 2L generated by the reduction, and the information to be displayed can be increased.

In FIG. 11C, the viewer detecting portion 32 detects that the pedestrian M moves to a position extremely close to the own vehicle 1. When the distance Lx is shorter than the second reference distance L2, the image control unit 33 further reduces the image "ABCD". As a result, the available display space of the display panel 2L is enlarged, and the own vehicle 1 displays still another image, for example, "efgh", so that the information to be displayed can be further increased.

In this way, the size of the image to be displayed on the display panel 2L is controlled according to a difference in the distance between the own vehicle 1 and the viewer M, the pedestrian M can reliably visually recognize the image. According to the control of the size of the image, another image can be displayed in the available display space, and the information to be displayed can be increased. As a result, the display effect on the display panel can be improved.

In this example, the own vehicle 1 controls the size of the image using the distance Lx, the first reference distance L1, and the second reference distance L2. However, by increasing the number of reference distances to the first to n-th (n is a natural number equal to or greater than 3), the own vehicle 1 can more finely control the size of the image. The own vehicle 1 may control the size of the image in a stepless manner according to a change in the absolute value of the distance without comparing the distance Lx with the reference distances.

In FIGS. 11A and 11B, when all the images cannot be displayed on the display panel 2L in order to enlarge the image, for example, the own vehicle 1 may display the image while scrolling the image from the left side to the right side of the display panel 2L. The own vehicle 1 may gradually decrease the size of the character as the pedestrian M approaches, and finally stop the scrolling and display the image on the display panel 2L in a stationary state.

(Second Display Control Form of Fifth Embodiment)

Figure 12A:
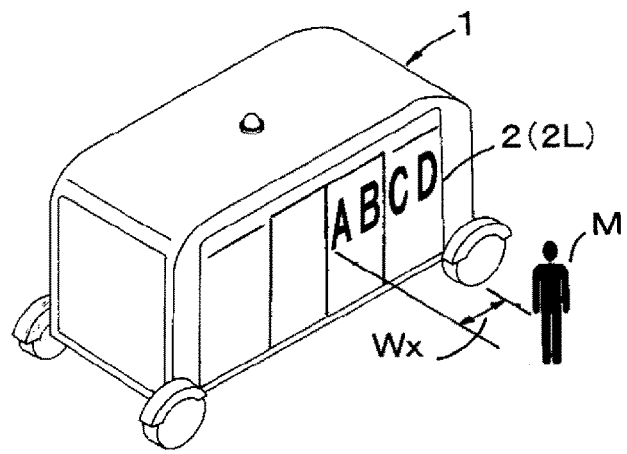
FIG. 12A is a schematic external diagram of a second display control form according to the fifth embodiment.
Figure 12B:
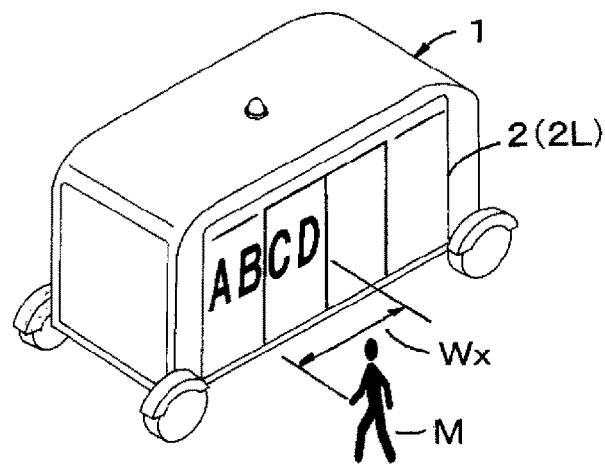
FIG. 12B is a schematic external diagram of the second display control form according to the fifth embodiment.
Figure 12C:
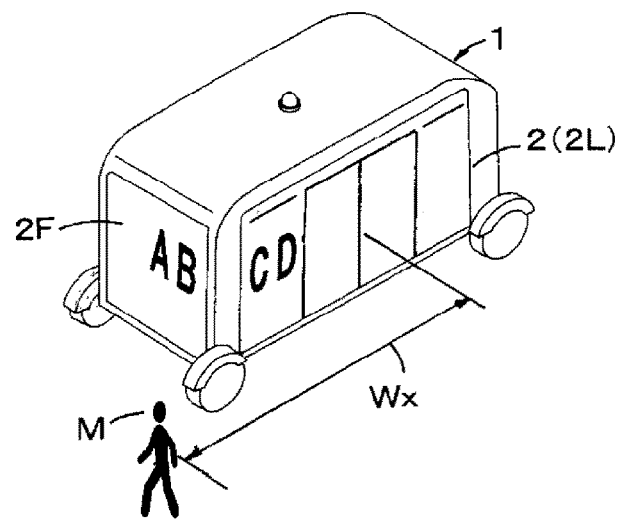
FIG. 12C is a schematic external diagram of the second display control form according to the fifth embodiment.

FIGS. 12A, 12B, and 12C are schematic external diagrams of a second display control form. In FIG. 12A, the viewer detecting portion 32 detects that the pedestrian M is in a direction of the left side surface of the own vehicle 1. The viewer detecting portion 32 sets a center position of the display surface of the display panel 2L on the left side surface in the horizontal direction as a reference position, and detects which distance Wx in the front-rear direction of the own vehicle 1 the pedestrian M is with respect to the reference position. In FIG. 12A, the viewer detecting portion 32 detects that the pedestrian M is on the rear side of the own vehicle 1 than the reference position based on the distance Wx. The image control unit 33 displays the image "ABCD" in characters having a predetermined size on the display panel 2L on the left side surface, which is the side where the pedestrian M is present, in particular, at a part on the rear side of the reference position. As a result, the image is displayed on a part of the display panel 2 that is close to the pedestrian M, and the pedestrian M can visually recognize the image.

As shown in FIG. 12B, when the viewer detecting portion 32 detects, based on the distance Wx, that the pedestrian M moves to a position on the front side of the own vehicle 1 than the reference position, or the pedestrian M is in the position, the image control unit 33 moves or switches the image "ABCD" to a part on the front side of the reference position on the display panel 2L on the left side surface. As a result, the image is moved from the rear side to the front side along with the movement of the pedestrian M, and the pedestrian M can visually recognize the image.

As shown in FIG. 12C, when the viewer detecting portion 32 detects, based on the distance Wx, that the pedestrian M is on the front side of the reference position, and further moves toward the front side than the front side surface of the own vehicle 1, or the pedestrian M is in this position, the image control unit 33 divides the image "ABCD" for display. That is, the image control unit 33 displays the image "AB" at the front end side on the display panel 2F on the front side surface, and displays the image "CD" at the rear end side on the display panel 2L on the left side surface. The pedestrian M can visually recognize the image of "ABCD" by visually recognizing the display panels 2F and 2L on the front side surface and on the left side surface at the same time.

Further, when the viewer detecting portion 32 detects that the pedestrian M moves to a position almost in front of the own vehicle 1, the image control unit 33 displays the entire image "ABCD" on the display panel 2F on the front side surface. The pedestrian M can visually recognize the image "ABCD" by visually recognizing the display panel 2F on the front side surface only. In this case, when the entire image cannot be displayed on the display panel 2F, the image may be reduced and displayed in the same manner as in the first display control form. Alternatively, the display may be performed by scrolling.

In a case where the state changes from FIG. 12A to FIG. 12B, the image control unit 33 may continuously move the displayed image "ABCD" according to the movement of the pedestrian M, so that the image is always displayed at the nearest position of the pedestrian M. This also applies to a case where the state changes from FIG. 12B to FIG. 12C.

In this way, the display position of the image to be displayed on the display panel 2 is controlled according to a change in the position of the pedestrian M with respect to the own vehicle 1 in the front-rear direction, so that the pedestrian M can visually recognize the image displayed on the display panel 2 reliably, and the display effect on the display panel 2 can be improved.

(Third Display Control Form of Fifth Embodiment)

Figure 13A:
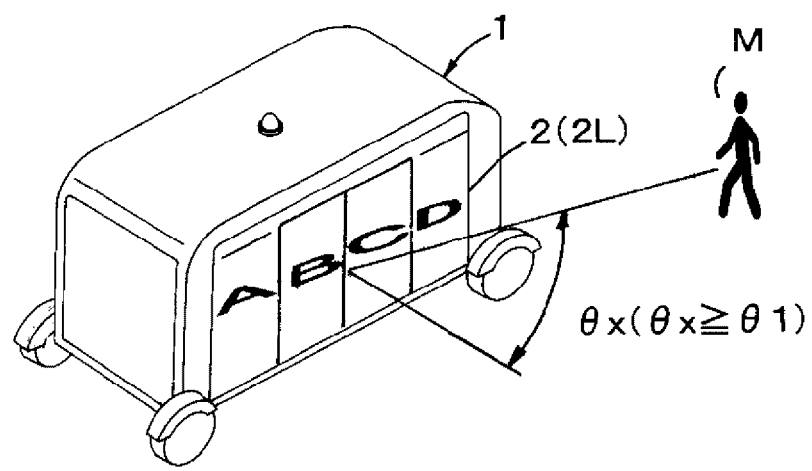
FIG. 13A is a schematic external diagram of a third display control form according to the fifth embodiment.
Figure 13B:
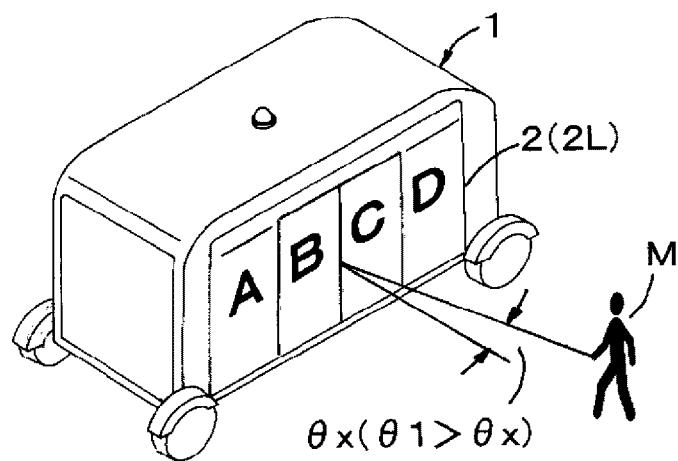
FIG. 13B is a schematic external diagram of the third display control form according to the fifth embodiment.

FIGS. 13A and 13B are schematic external diagrams of a third display control form. In FIG. 13A, the viewer detecting portion 32 detects that the pedestrian M is at a position diagonally rearward to the left of the own vehicle 1. The viewer detecting portion 32 detects an angle θx of the pedestrian M with respect to a normal line (a normal line at the reference position) of the display panel 2L on the left side surface. When the angle θx is larger than a predetermined reference angle θ1, the image control unit 33 displays the image "ABCD" on the display panel 2L on the left side surface, which is the side where the pedestrian M is present, with a shape longer than normal (font in the case of a character image).

That is, the image control unit 33 displays an image in which a dimension of each character image in the horizontal direction is larger than a normal aspect ratio of each character image. In this case, the image control unit 33 adjusts a vertical dimension of each image so as to fall within the display surface of the display panel 2L in the horizontal direction. When the pedestrian M visually recognizes the image from a horizontal diagonal direction of the display panel 2L, an apparent horizontal dimension of the image becomes shorter, but by displaying the image horizontally in this way, the pedestrian M can visually recognize the image as an image having an aspect ratio close to normal.

As shown in FIG. 13B, when the viewer detecting portion 32 detects that the angle θx becomes smaller than the reference angle θ1 and the pedestrian M moves to a position close to the front surface of the left side surface of the own vehicle 1, the image control unit 33 displays the image in a shape in which the horizontal dimension of the image is gradually reduced. As a result, when the image is a character image, the image control unit 33 can display as a character image whose aspect ratio is close to that of a normal font, or as an image with a normal aspect ratio. In this way, as the pedestrian M moves to the front position of the display panel 2L, the image control unit 33 changes the ratio of the horizontal and vertical dimensions of the font, so that the pedestrian M can always visually recognize an image having a normal shape, and in the case of a character image, a normal font or a character image having a shape close to the normal font.

In the third display control form, the image control unit 33 may also continuously change the aspect ratio according to the movement of the pedestrian M. Further, in the third display control form, the image control unit 33 can perform the same display control even when an image other than characters is displayed. In this way, the shape of the image to be displayed on the display panel 2 is controlled according to a change in the position and direction of the pedestrian M with respect to the own vehicle 1, so that the pedestrian M can visually recognize the image as a normal shape, and the display effect on the display panel 2 can be improved.

The first display control form to the third display control form described above are examples of display control based on a change in the relative position between the own vehicle (automatic driving vehicle) 1 and the pedestrian (viewer) M. Even when the pedestrian M is stationary on the road while the own vehicle 1 moves, and the relative position or the relative direction of the own vehicle 1 with respect to the pedestrian M changes, the own vehicle 1 can realize the same display control. In particular, the second display control form and the third display control form are effective when the own vehicle 1 travels in the front-rear direction and moves relative to the pedestrian M.

As a specific example of the first display control form, a case where the automatic driving vehicle is applied to a passenger bus is considered. When a bus is traveling at a position away from the bus stop, an image indicating the destination of the bus is displayed large on the display panel on the front side surface, and a passenger at the bus stop can be visually recognize the image easily. When the bus comes close to the bus stop, the image is gradually reduced, and the additional information, for example, an image such as "express line", is displayed in the available display space. As a result, the passenger at the bus stop can visually recognize the display panel easily.

Similarly, as a specific example of the second display control form, in a case where the automatic driving vehicle is applied to the bus, when the bus stops at the bus stop, the image indicating the destination is moved from the display panel on the front side surface of the bus to the display panel on the left side surface of the bus located in front of the passenger. When the bus is completely stopped, the image is displayed near the entrance and exit, for example, on the display panel of the slide door 12. The image may be displayed on the display panel on the left side surface immediately before the bus stops, and at this time, since the passenger visually recognizes the display panel from an oblique direction, the image may be displayed horizontally as in the third display control form.

The first display control form to the third display control form can be applied to a case where both the own vehicle 1 and the pedestrian M are moving. That is, in a case where a relative positional relationship between the own vehicle 1 and the pedestrian M is the same as that of the first display control form to the third display control form, by controlling the size, the display position, and the shape of the image to be displayed, the pedestrian can visually recognize the image reliably, and the display effect on the display panel can be improved.

In the first display control form to the third display control form, the brightness (including the luminance, the color saturation, and the contrast) of the image may be changed at the same time as controlling the size, the display position, and the shape of the image to be displayed. In particular, in the first display control form, when a relative distance between the own vehicle and the pedestrian is long, the luminance and the contrast may be controlled to be high together with the control of the size of the image, and the luminance and the contrast may be controlled to be lower as the relative distance becomes shorter. Alternatively, only the luminance and the contrast may be controlled instead of the size of the image.

The first display control form to the third display control form are the same in a case where the viewer is an occupant of another vehicle. In a case where the own vehicle is stopped and another vehicle is approaching, or in a case where another vehicle is stopped and the own vehicle is traveling, the display effect of the display panel can be improved by controlling the image display of the display panel of the own vehicle with respect to the occupant of the other vehicle based on each of the first display control form to the third display control form.

In a case where the own vehicle 1 and the other vehicle are traveling in the same direction, the image is displayed on the display panel 2B on the rear side surface of the own vehicle 1 when the other vehicle is traveling behind the own vehicle 1, and the display position of the image is moved from the display panel 2B on the rear side surface to the display panel 2R on the right side surface when the other vehicle overtakes the own vehicle 1. When the own vehicle 1 is traveling behind the other vehicle, the image is displayed on the display panel 2F on the front side surface of the own vehicle 1, and when the own vehicle 1 overtakes the other vehicle, the display position of the image is moved from the display panel 2F on the front side surface to the display panel 2L on the left side surface.

By controlling the change of the display position in this manner, the occupant in the other vehicle can visually recognize the image displayed on the display panel 2 of the own vehicle 1 regardless of the change in the relative positional relationship with the own vehicle 1. In this case, the display effect can be improved by controlling the size, shape, and brightness of the image based on the change in the relative distance or relative position between the own vehicle 1 and the other vehicle.

Sixth Embodiment

Figure 14:
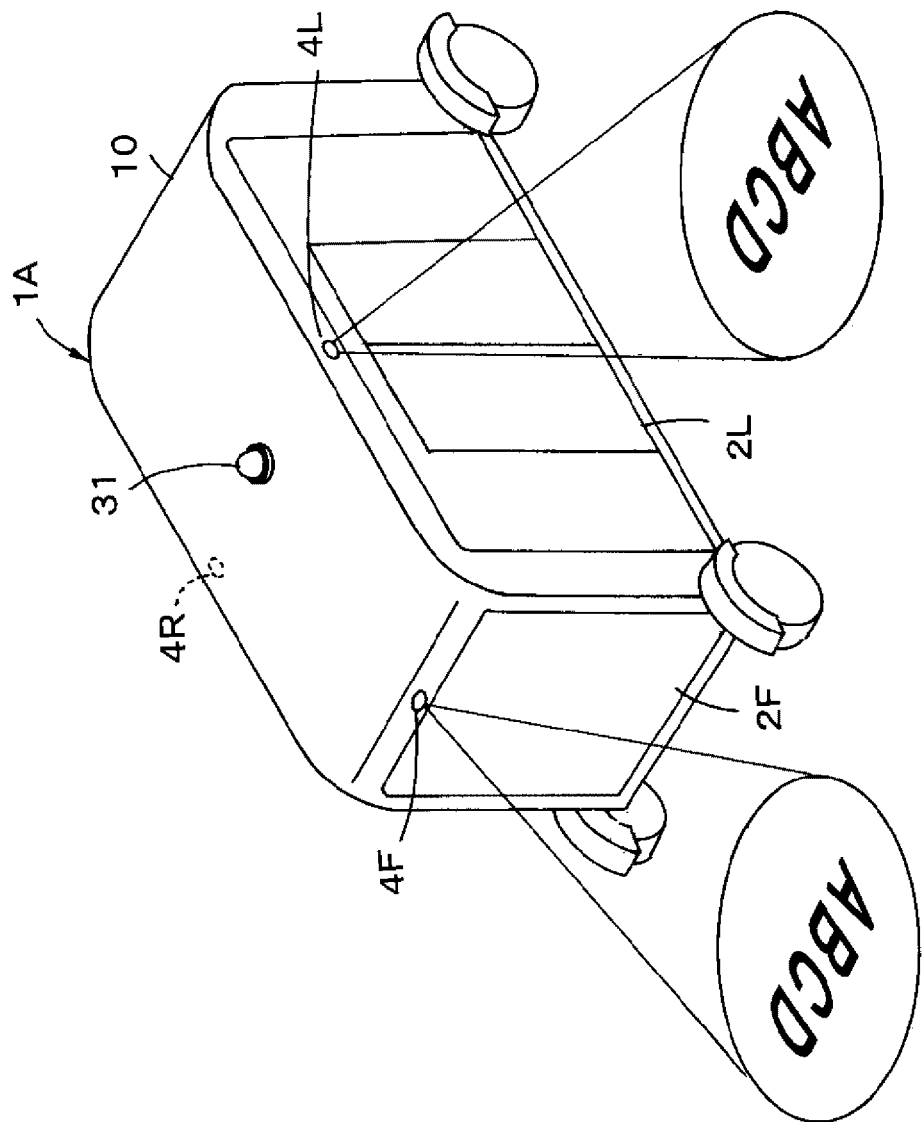
FIG. 14 is a schematic external diagram of an automatic driving vehicle according to a sixth embodiment.

FIG. 14 is a schematic external diagram of an automatic driving vehicle 1A according to a sixth embodiment. Parts equivalent to those of the automatic driving vehicle 1 according to the fifth embodiment are denoted by the same reference numerals, and detailed description thereof is omitted. In the sixth embodiment, projectors 4F, 4R, 4L are respectively arranged on the front side surface, the left side surface, and the right side surface of the automatic driving vehicle 1A, and a required image can be projected onto a road surface in front of the automatic driving vehicle (hereinafter, referred to as the own vehicle) 1A or onto a road surface on the left and right sides of the own vehicle 1A. That is, in the sixth embodiment, in addition to the display panel 2 arranged on the side surfaces of the vehicle body 10, the projectors 4F, 4R, 4L are provided as a part of the vehicular display device.

The image control unit 33 controls the image display of the display panels 2 (2F, 2B, 2L, 2R) arranged on the vehicle body 10 as indicated by a two-dot chain line in FIG. 10, and controls the size, the projection position, the shape, and the brightness of an image to be projected on the road surface by the projectors 4F, 4R, 4L. The control of the projection image of the projector is effective when the other vehicle is a non-automatic driving vehicle, and for example, the following fourth display control form is executed.

(Fourth Display Control Form of Sixth Embodiment)

In the fifth embodiment, in a case where the relative position between the own vehicle 1A and the other vehicle changes, for example, when one of the own vehicle 1A and the other vehicle overtakes the other, the second display control form is applied, and the display position of the image is controlled to move from the display panel 2F or 2B on the front side surface or the rear side surface of the own vehicle to the display panel 2R or 2L on the right side surface or the left side surface of the own vehicle. When the other vehicle is an automatic driving vehicle, there is no problem that an occupant of the other vehicle visually recognizes the display panels 2R and 2L on the left and right side surfaces of the own vehicle 1A. However, in a case where the other vehicle is a non-automatic driving vehicle, it is not preferable from the viewpoint of safe driving that a driver of the other vehicle visually recognizes the display panels 2R and 2L on the right side surface or the left side surface of the own vehicle 1A since the driver looks aside while driving.

Figure 15A:
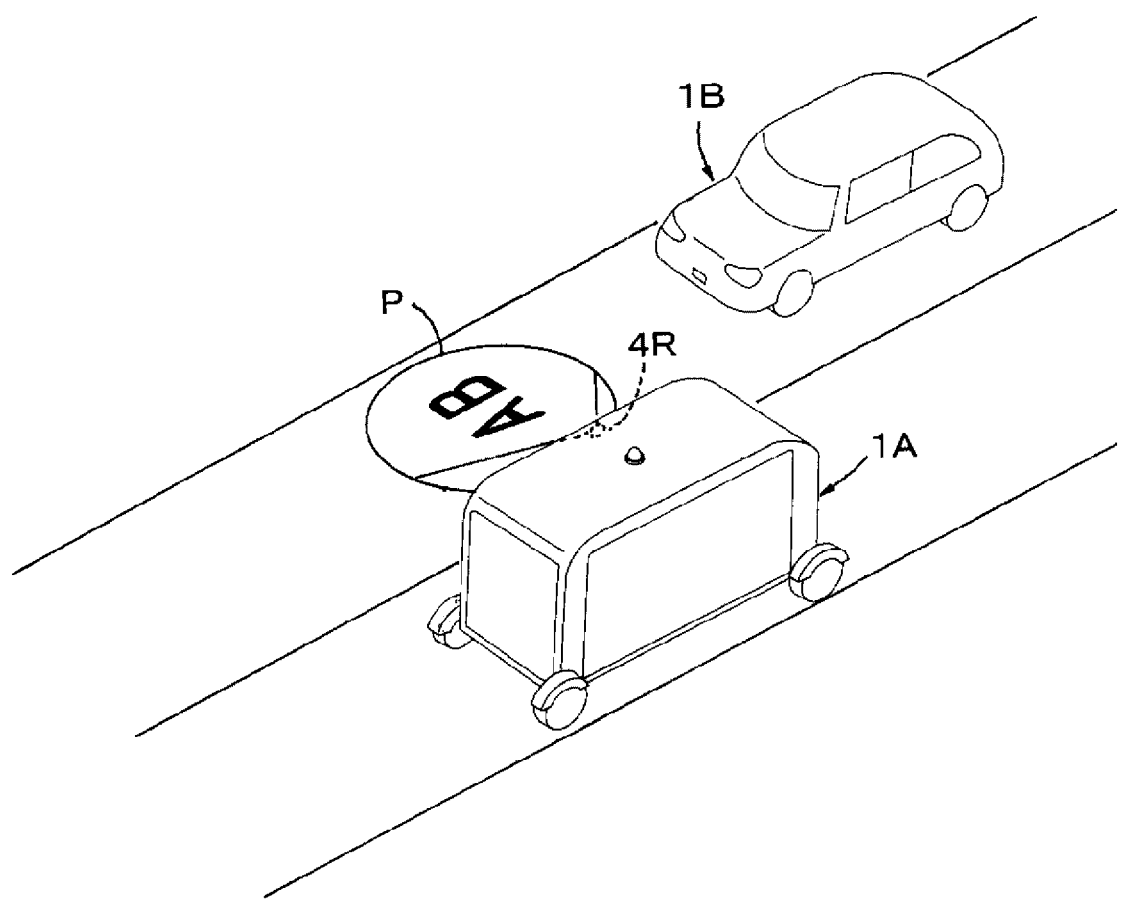
FIG. 15A is a schematic external diagram of a first aspect of a fourth display control form according to the sixth embodiment.

Therefore, when the viewer detecting portion 32 detects that the other vehicle is a non-automatic driving vehicle, the image control unit 33 projects an image to be displayed by the projectors 4F, 4R, 4L. For example, when the other vehicle 1B is traveling behind the own vehicle 1A, an image is displayed on the display panel 2B on the rear side surface of the own vehicle 1A. As shown in FIG. 15A, when the other vehicle 1B approaches the right rear portion of the own vehicle 1A, an image P is projected and displayed on the road surface at the right side of the own vehicle 1A immediately before the other vehicle 1B by the right projector 4R of the own vehicle 1A.

Figure 15B:
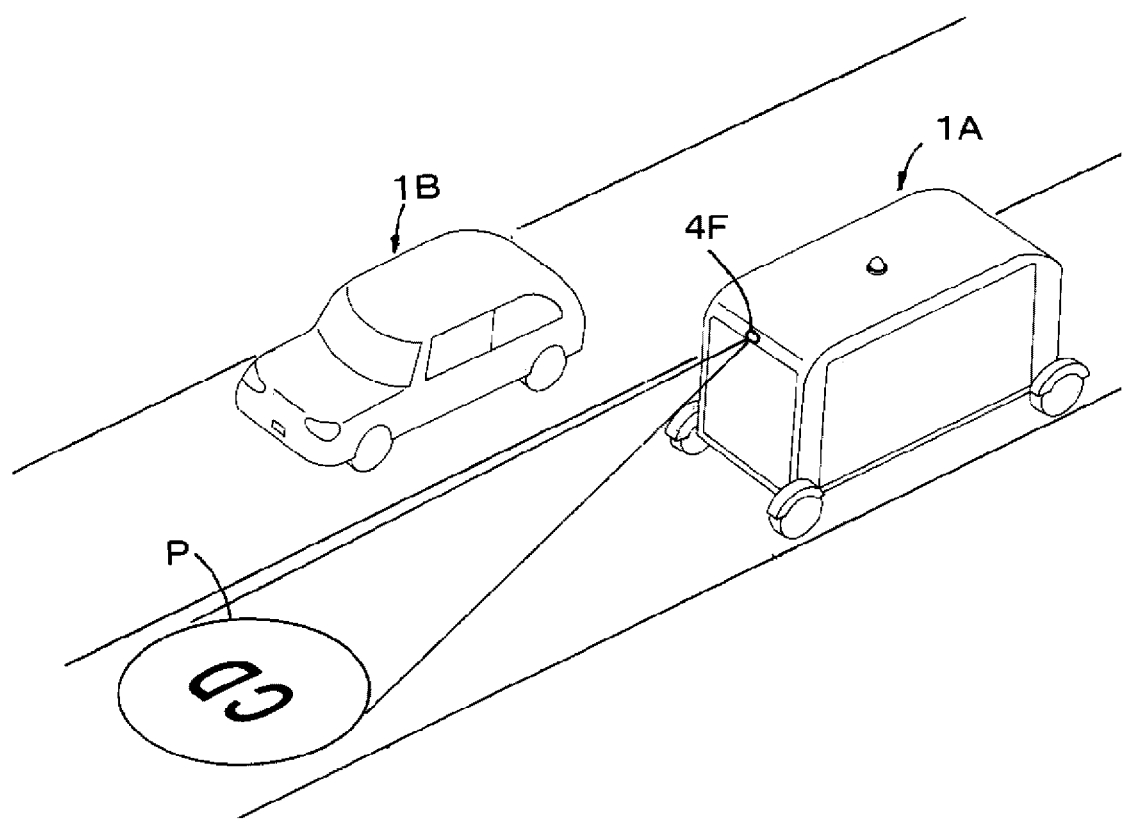
FIG. 15B is a schematic external diagram of the first aspect of the fourth display control form according to the sixth embodiment.

As shown in FIG. 15B, when the other vehicle 1B is lined up on the right side of the own vehicle 1A, the image control unit 33 projects and displays the image P on the road surface in front of the own vehicle 1A by the front projector 4F. When the other vehicle 1B completes the overtaking of the own vehicle 1A, the image may be projected and displayed on the display panel 2F on the front side surface of the own vehicle 1A. A driver of the other vehicle 1B can visually recognize the image with a rearview mirror.

In this way, the display position of the image is changed from the display panel 2B on the rear side surface of the own vehicle 1A to the road surface on the right side by the right projector 4R, and further to the road surface on the front side by the front projector 4F. As a result, the driver of the other vehicle 1B can visually recognize the image displayed by the own vehicle 1A while holding the line of sight forward without turning the line of sight to the left, so that safety traveling is ensured.

Figure 16A:
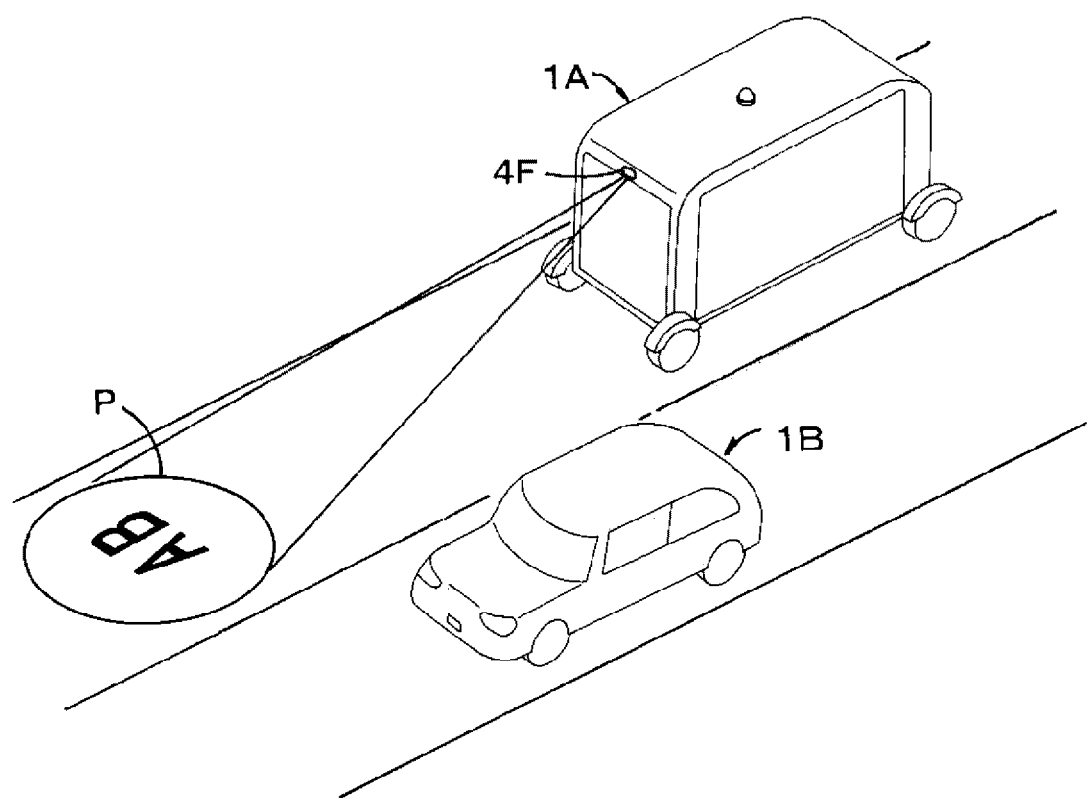
FIG. 16A is a schematic external diagram of a second aspect of the fourth display control form according to the sixth embodiment.

When the own vehicle 1A is traveling behind the other vehicle 1B, the image control unit 33 displays an image on the display panel 2F on the front side surface of the own vehicle 1A. A driver of the other vehicle 1B can visually recognize the image with a rearview mirror. When the own vehicle 1A overtakes the other vehicle 1B, as shown in FIG. 16A, the image control unit 33 switches the display of the image from the display panel to the projector, and the projector 4F on the front side of the own vehicle 1A projects and displays the image P on the road surface immediately before the own vehicle 1A, which is the right front side of the other vehicle 1B.

Figure 16B:
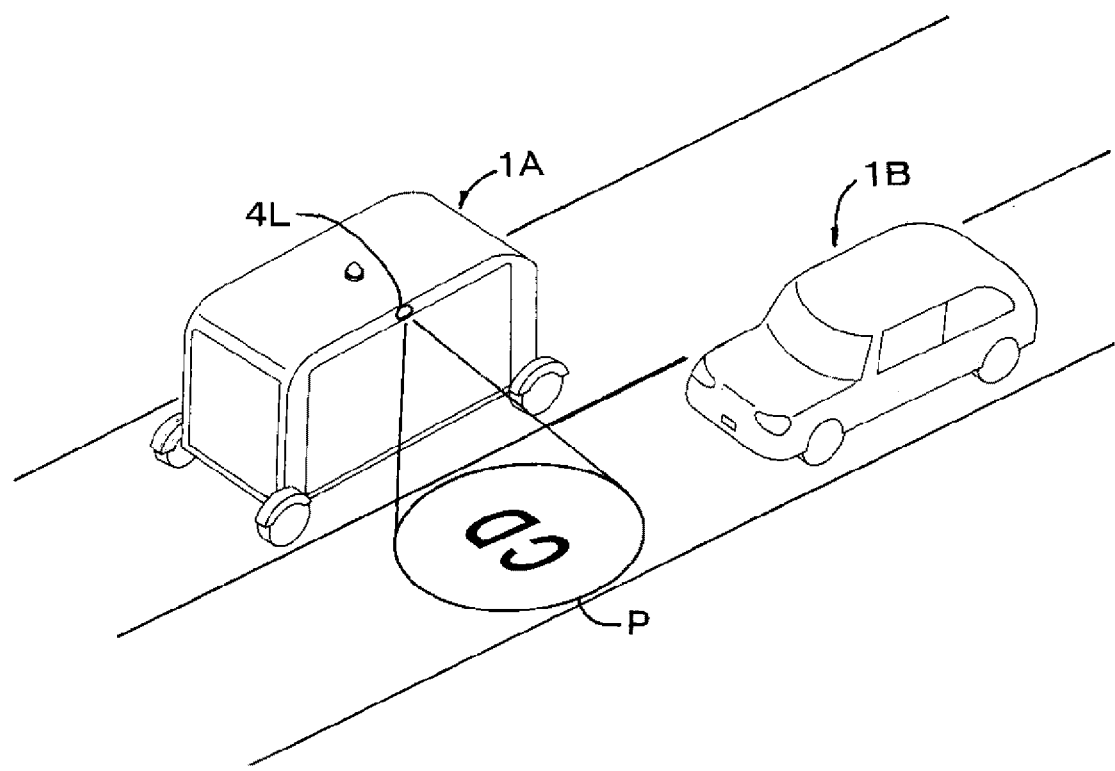
FIG. 16B is a schematic external diagram of the second aspect of the fourth display control form according to the sixth embodiment.

As shown in FIG. 16B, when the own vehicle 1A overtakes the other vehicle 1B, the image control unit 33 switches the display of the image from the front projector 4F to the left projector 4L, and projects and displays the image P on the road surface immediately before the other vehicle 1B. When the overtaking is completed, the image may be displayed on the display panel 2B on the rear side surface of the own vehicle 1A.

In this way, the display position is changed between the image display by the display panel 2 and the image display on the road surface by the projector 4, so that the driver of the other vehicle 1B can visually recognize the projected image while holding the line of sight forward without turning the line of sight to the right to visually recognize the image on the display panel 2L on the left side surface of the own vehicle 1A, and the safe traveling is ensured.

In the fourth display control form, the size, the display position, the shape, and the brightness of the image to be displayed by the projectors 4F, 4R, 4L are also controlled based on the relative positional relationship between the own vehicle 1A and the other vehicle (non-automatic driving vehicle) 1B, so that the visual recognition of the occupant (driver) in the other vehicle 1B can be ensured, and the display effect can be improved.

The sixth embodiment includes a plurality of projectors. In addition, a projection position of an image to be projected on the road surface by one projector may be moved, and the image may be displayed by selecting a front region or a rear region from the left and right regions of the own vehicle. In this manner, it is possible to implement the display control in which an image to be displayed on the display panel of each side surface of the automatic driving vehicle of the fifth embodiment is replaced with an image to be displayed by the projector.

Similarly, for the fourth display control form, the image display on the road surface by the projector is also possible in the case where the other vehicle is an automatic driving vehicle. In particular, even an occupant who have difficulty in visually recognizing a display panel on a side surface of the own vehicle (an automatic driving vehicle including the display device according to the present disclosure), such as an occupant sitting in a front seat in the vehicle cabin of the other vehicle, can visually recognize an image projected on the road surface by the projector.

In the present disclosure, one sensor is arranged on the upper surface of the roof of the vehicle body 10, and the sensor may detect a viewer (pedestrian, another vehicle) present at 360° around the vehicle.

Seventh Embodiment

Figure 17:
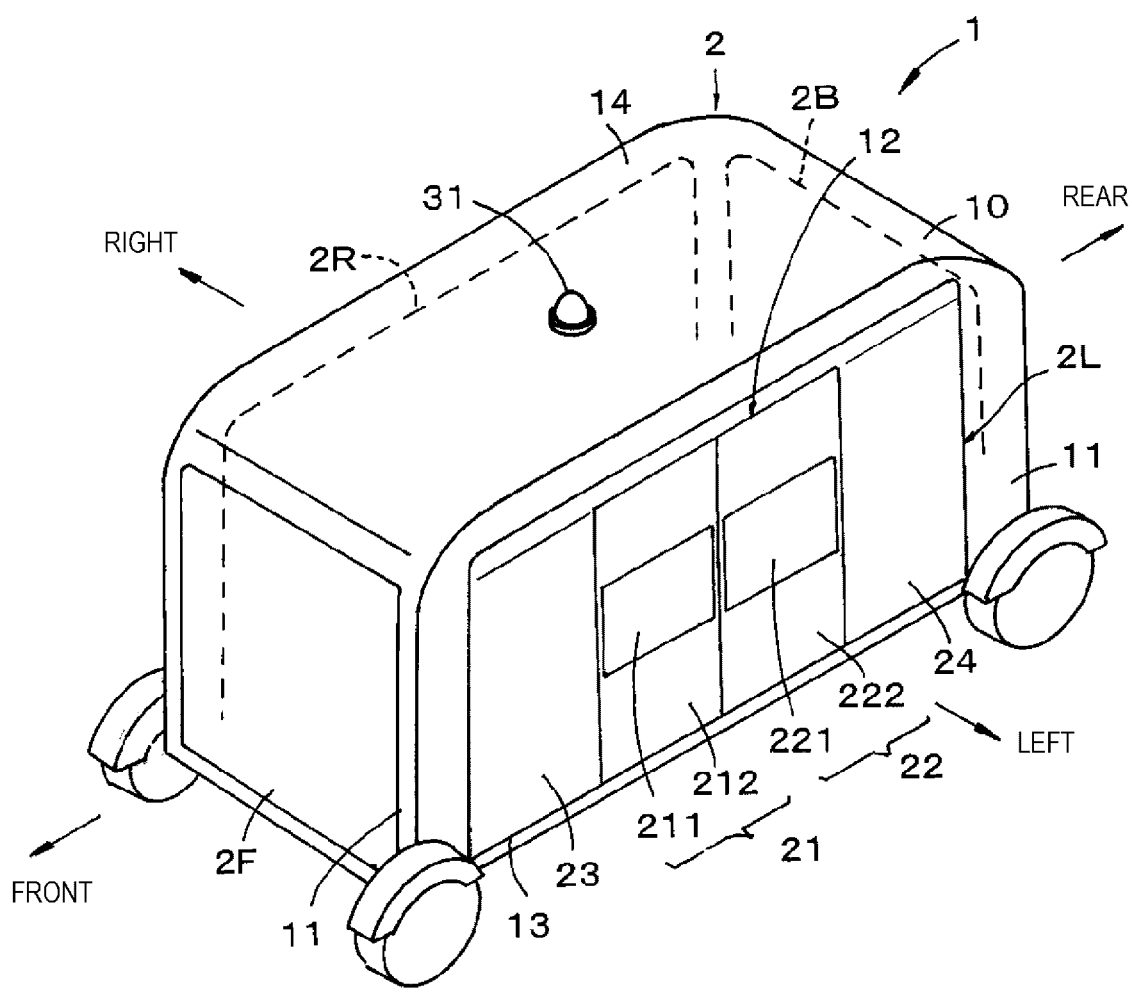
FIG. 17 is a schematic external diagram of an automatic driving vehicle according to a seventh embodiment.

FIG. 17 is a schematic external diagram of an automatic driving vehicle according to a seventh embodiment to which the vehicular display device according to the present disclosure is applied.

The display panels 2 (2F, 2B, 2L, 2R) are arranged on the front side surface and the rear side surface, as well as the left side surface and the right side surface of the vehicle body 10. In particular, the display panel 2L on the left side surface includes four display panels, which are a combination of two display panels 21 and 22 arranged on the two slide doors 12 respectively, and two display panels 23 and 24 arranged on the side surface 13 on both sides sandwiching the slide doors.

Each of the four display panels 21 to 24 on the left side surface is implemented by a display panel in which pixels are arranged at a predetermined density. The two display panels 21 and 22 arranged on the slide doors 12 are implemented by display panels 211 and 221 in which pixels are arranged at a high density in a central area in an upper-lower direction. Hereinafter, a display panel in which pixels are arranged at a predetermined density is referred to as a low resolution panel, and a display panel in which pixels are arranged at a high density in comparison with the low resolution panel is referred to as a high resolution panel.

In the display panels 21 and 22 of the two slide doors 12, a part of the central area in the upper-lower direction of the respective display areas is configured with high resolution panels 211 and 221. The high resolution panels 211 and 221 are at regions corresponding to an average human eye height position of about 0.7 m to 1.7 m from the ground. In the two display panels 21 and 22 of the slide doors 12, the central area in the upper-lower direction is configured with the high resolution panels 211 and 221, and upper and lower display areas sandwiching the high resolution panels 211 and 221 are configured with low resolution panels 212 and 222.

The sensor 31 is arranged in an upper portion of the roof 14 of the vehicle body 10. The sensor 31 detects a viewer, that is, a person such as a pedestrian present in the surroundings of the automatic driving vehicle 1, particularly in a left-side area.

Figure 18:
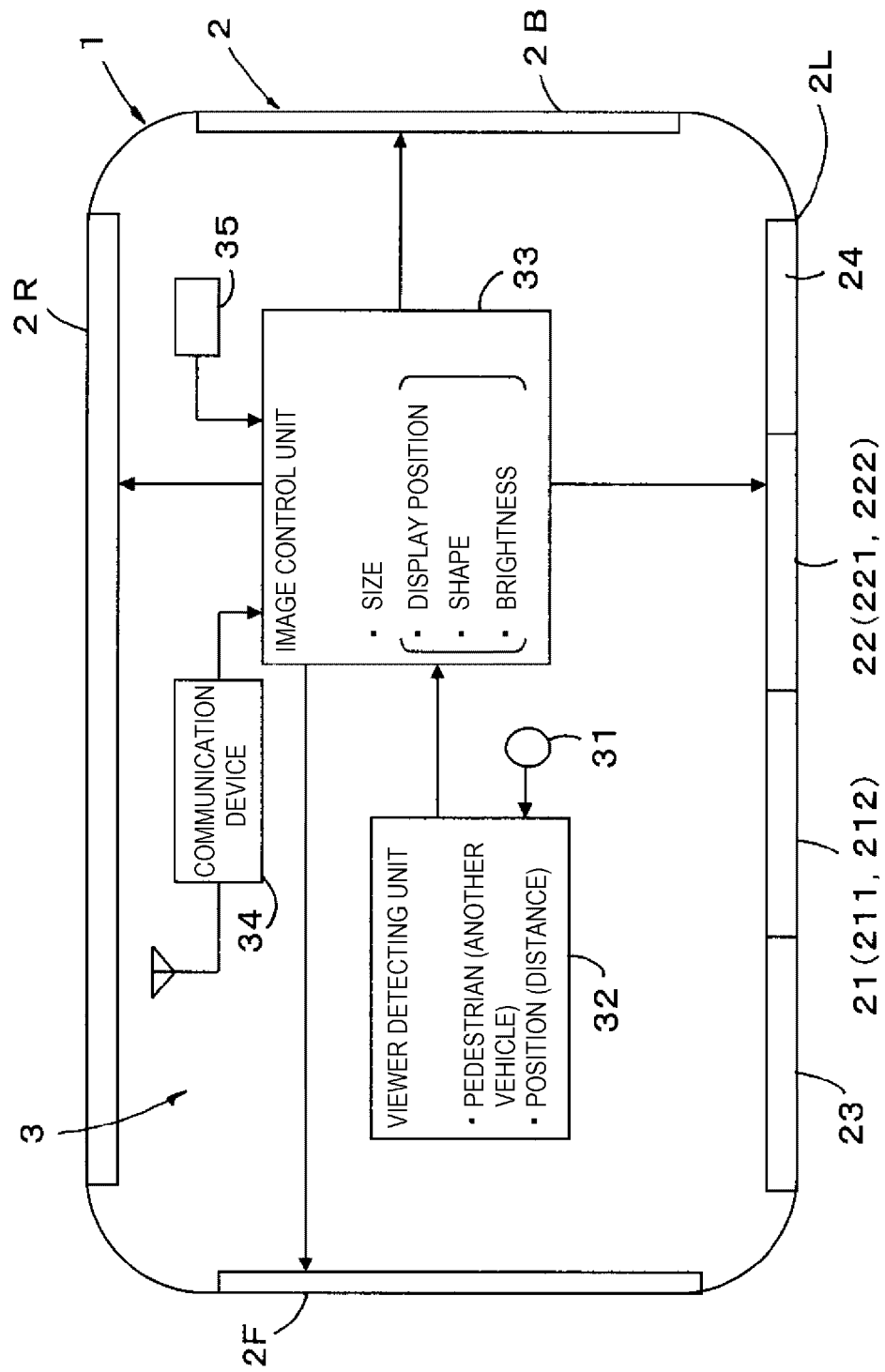
FIG. 18 is a block configuration diagram of a display control unit according to the seventh embodiment.

FIG. 18 is a block configuration diagram of the display control unit 3 that controls the display panels 2. The display control unit 3 includes the viewer detecting portion 32 and the image control unit 33 in addition to the sensor 31. The viewer detecting portion 32 detects a viewer who visually recognizes the display panel 2 of the automatic driving vehicle 1, in particular, the display panel 2L on the left side surface, based on the output of the sensor 31. The sensor 31 and the viewer detecting portion 32 configure a viewer detecting unit. The viewer detecting portion 32 further detects position information of the detected viewer, in particular, whether the viewer is in the vicinity of or away from the left side surface of the automatic driving vehicle 1.

When detecting the position information of the viewer, the viewer detecting portion 32 detects, for example, a distance between the automatic driving vehicle and the viewer, and determines whether the distance is greater than a predetermined distance or not, so as to detect whether the viewer is far or near. The viewer detecting portion 32 may simply detect the detected distance as the position information.

In the automatic driving vehicle 1 including the vehicular display device, the image control unit 33 displays, based on the input data, a required image on the display panels 2 (2F, 2B, 2L, 2R) arranged on the front, rear, left, and right side surfaces of the vehicle body 10. Then, for the display panel 2L on the left side surface, a display form of an image is controlled based on the position information of the viewer detected by the viewer detecting portion 32.

FIGS. 19A, 19B, 20A, and 20B are schematic external diagrams of display control forms. In FIGS. 19A, 19B, 20A, and 20B, the automatic driving vehicle 1 is parked or stopped, and the viewer M is on the left side of the automatic driving vehicle 1. When the viewer detecting portion 32 detects the viewer M, a distance Lx between the viewer M and the automatic driving vehicle 1 is detected, and the distance Lx is compared with a reference distance. When the distance is equal to or longer than the reference distance, it is determined that the viewer is far, and when the distance is shorter than the reference distance, it is determined that the viewer is near.

Figure 19A:
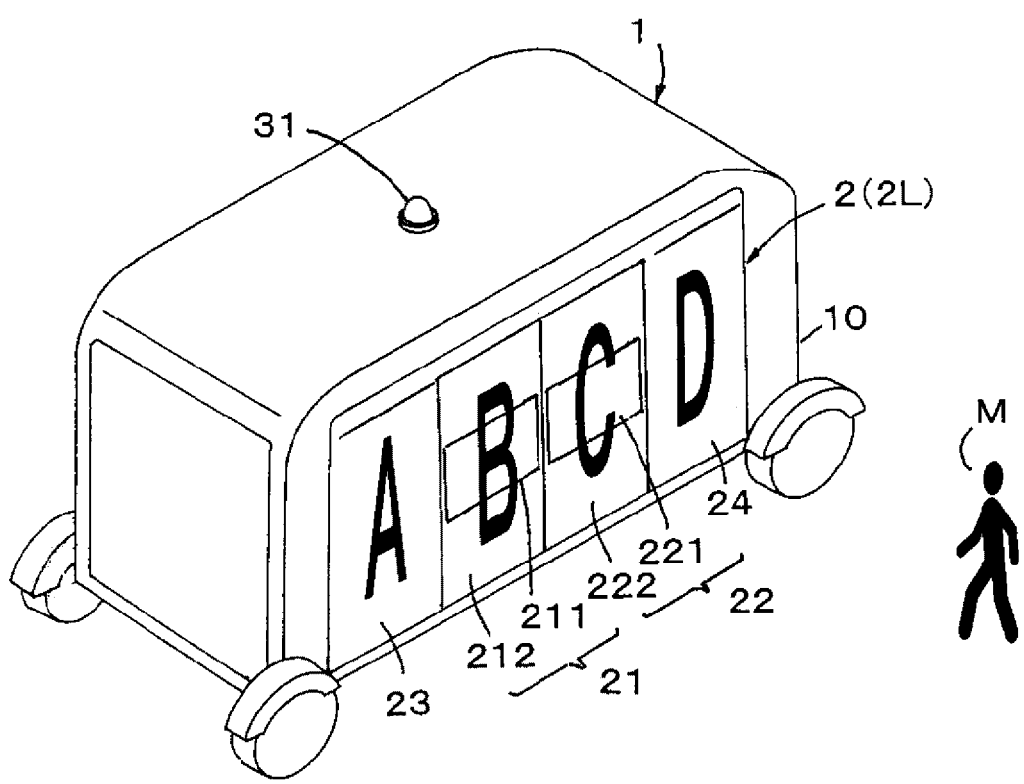
FIG. 19A is an external perspective diagram and a partially enlarged diagram showing a first display control form according to the seventh embodiment.

The image control unit 33 displays a required image on the display panel 2 based on the data from the communication device 34 or the input unit 35. As shown in FIG. 19A, when it is determined that the viewer M is far by the viewer detecting portion 32, the image control unit 33 displays an image in the entire display area of the four display panels 21 to 24 on the left side surface. In FIG. 19A, four images of the image "ABCD" are displayed on the display panels 21 to 24 respectively, and the image is displayed as enlarged images as much as possible.

Figure 19B:
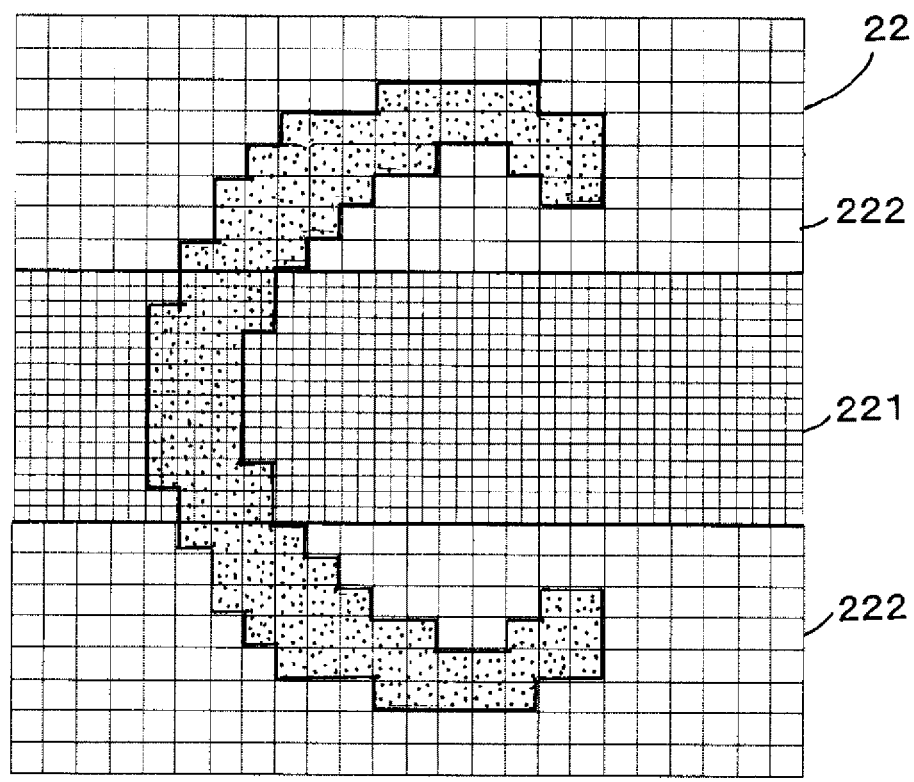
FIG. 19B is an external perspective diagram and a partially enlarged diagram showing the first display control form according to the seventh embodiment.

In the display panel 22 on the rear slide door of the two slide doors 12, the image "C" is displayed in an enlarged manner over the entire display area of the display panel 22, that is, over a region including both display areas of the high resolution panel 221 and the low resolution panel 222, as shown in FIG. 19B with a part enlarged. Although the resolution of the image is low in the display area of the low resolution panel 222, the image "C" is displayed as an enlarged image, and the viewer visually recognizes the image "C" from a distant position. Therefore, there is no problem that the resolution of the image is low, and the viewer can visually recognize and confirm the image. Since the resolution of the image is high in the display area of the high resolution panel 221, the resolution does not become a problem. At this time, the high resolution panel may display an image with the same resolution as that of the low resolution panel.

Figure 20A:
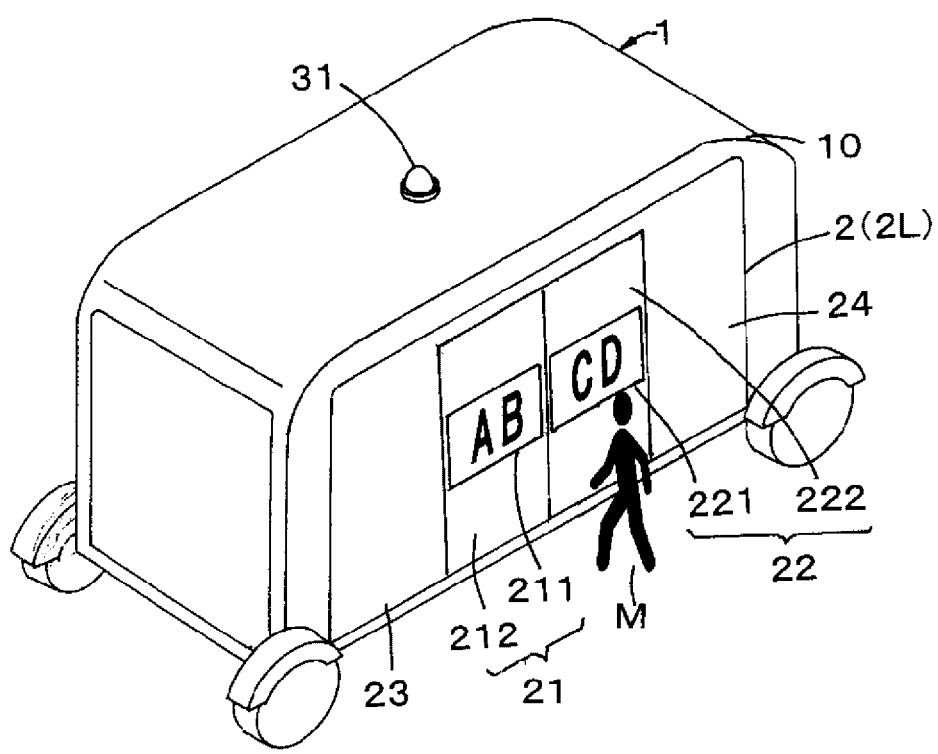
FIG. 20A is an external perspective diagram and a partially enlarged diagram showing a second display control form according to the seventh embodiment.

On the other hand, as shown in FIG. 20A, when the viewer detecting portion 32 detects that the viewer M is approaching the left side surface of the automatic driving vehicle 1, the image control unit 33 reduces the displayed image "ABCD", and displays these images in the display area of the high resolution panels 211 and 221 of the two display panels 21 and 22 on the slide doors. In FIG. 20A, the image "AB" is displayed on the high resolution panel 211 of the front slide door, and the image "CD" is displayed on the high resolution panel 221 of the rear slide door.

Figure 20B:
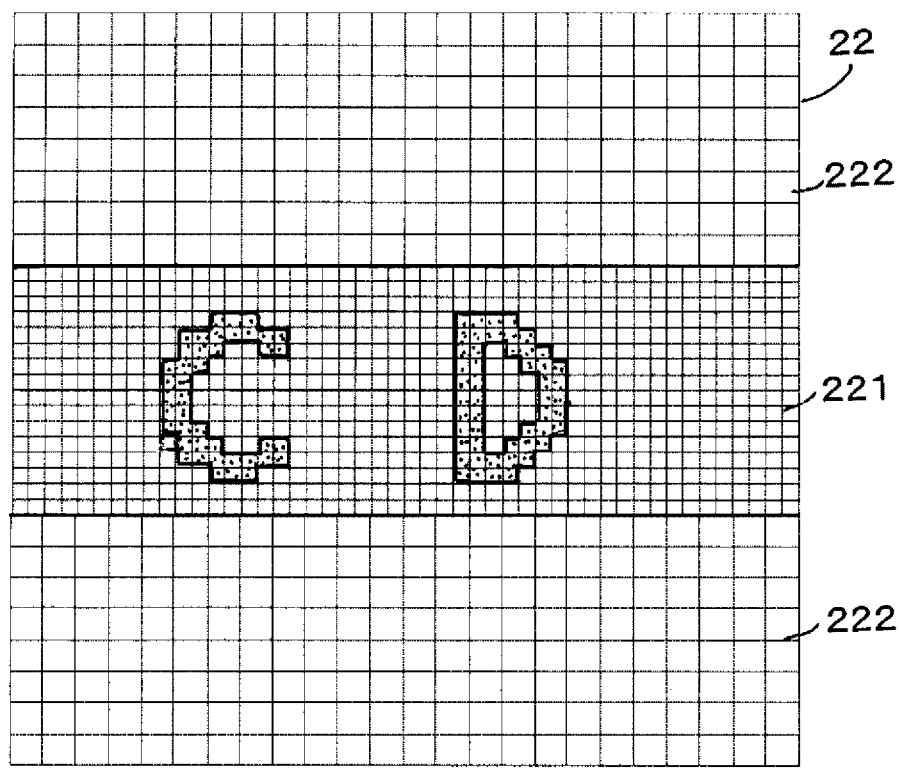
FIG. 20B is an external perspective diagram and a partially enlarged diagram showing the second display control form according to the seventh embodiment.

In the display panel 22 of the rear slide door, an image is not displayed in the display area of the low resolution panel 222, and the image "CD" is reduced so as to be contained in the display area of the high resolution panel 221 and displayed with high definition, as shown in FIG. 20B with a part enlarged. Since the high resolution panel 221 has a high image resolution, the image can be displayed as a high-definition image even if the image is reduced. In addition, since the viewer M is approaching the automatic driving vehicle 1 and the high resolution panel 221 is located at the height position of the human eye, the viewer can visually recognize the reduced image.

At this time, the supply of electric power to the low resolution panels 212 and 222 is stopped so as not to display an image, so that power is saved accordingly. Further, when there is a margin in the display area of the high resolution panels 211 and 221 due to the reduction of the image, another image may be displayed, and information to be displayed can be increased.

In FIG. 17, when the viewer gets on and off the automatic driving vehicle 1, the slide door 12 is in an open state. When each slide door 12 moves to the outer surface side of the left side surface 13 of the vehicle body 10 during the opening and closing operation, the display panels 23 and 24 are hidden by the slide doors 12 when the slide doors 12 are opened. In this case, since the display panels 21 and 22 on the slide doors 12 are positioned outside the display panels 23 and 24, the viewer can visually recognize high-definition images displayed on the high resolution panels 211 and 221 at the time of getting on and off.

As described above, most of the display areas of the display panels 21 and 22 are the low resolution panels 212 and 222. However, when the viewer M is far from the automatic driving vehicle 1, the image is enlarged and displayed on the display panels 21 and 22, so that the viewer M can visually recognize the image reliably, and the resolution of the low resolution panels 212 and 222 does not become a problem. On the other hand, when the viewer is close to the automatic driving vehicle 1, the image is reduced and displayed on the high resolution panels 211 and 221 formed on parts of the display panels 21 and 22, so that the viewer M can visually recognize the image reliably, and more information can be obtained. As a result, the image can be displayed on the display panel, and cost can be reduced.

When the image is enlarged and displayed, the display control may be performed such that the size of the image is continuously changed according to a change in the distance between the automatic driving vehicle and the viewer. That is, the image displayed in an enlarged manner may be gradually reduced as the viewer approaches the automatic driving vehicle, and the image may be displayed in the display area of the high resolution panel when the distance is equal to or shorter than a predetermined distance.

Further, in the image display shown in FIGS. 19A, 19B, 20A, and 20B, when all of the enlarged images cannot be simultaneously displayed on the display panels 21 and 22 or the display panels 21 to 24, or when all of the reduced images cannot be simultaneously displayed on the high resolution panels 211 and 221, the images may be displayed while being scrolled on the display panels.

The above description is an example in which the viewer moves with respect to the automatic driving vehicle. The present disclosure can implement the same display control even when the viewer is stationary and the automatic driving vehicle 1 moves with respect to the viewer. For example, in a case where the automatic driving vehicle is applied to a passenger bus, when the bus is traveling at a position away from the bus stop, an image indicating the destination of the bus is displayed in a large size over the entire display area of the display panel including the low resolution panel, so that a passenger at the bus stop can visually recognize the image. When the bus stops at the bus stop, the image is displayed on the high resolution panel, and an image such as another image, for example, a bus stop name to be stopped ahead, is displayed, so that a passenger can visually recognize these images in a clear state.

(First Modification of Seventh Embodiment)

Figure 21A:
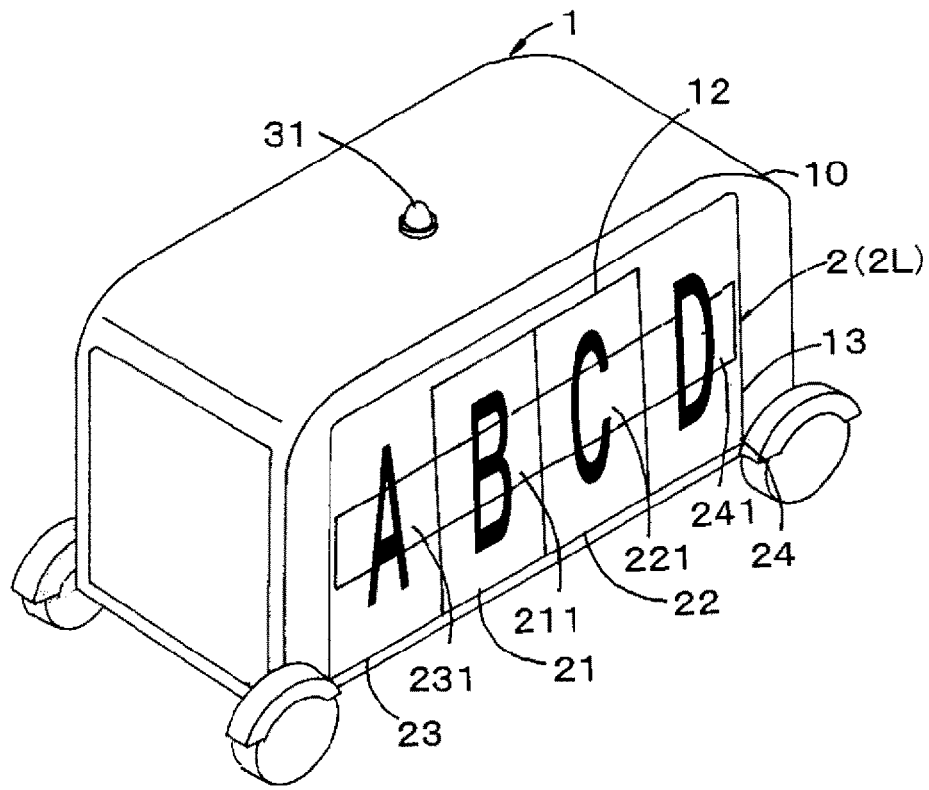
FIG. 21A is an external perspective diagram showing a display control form according to a modification of the seventh embodiment.
Figure 21B:
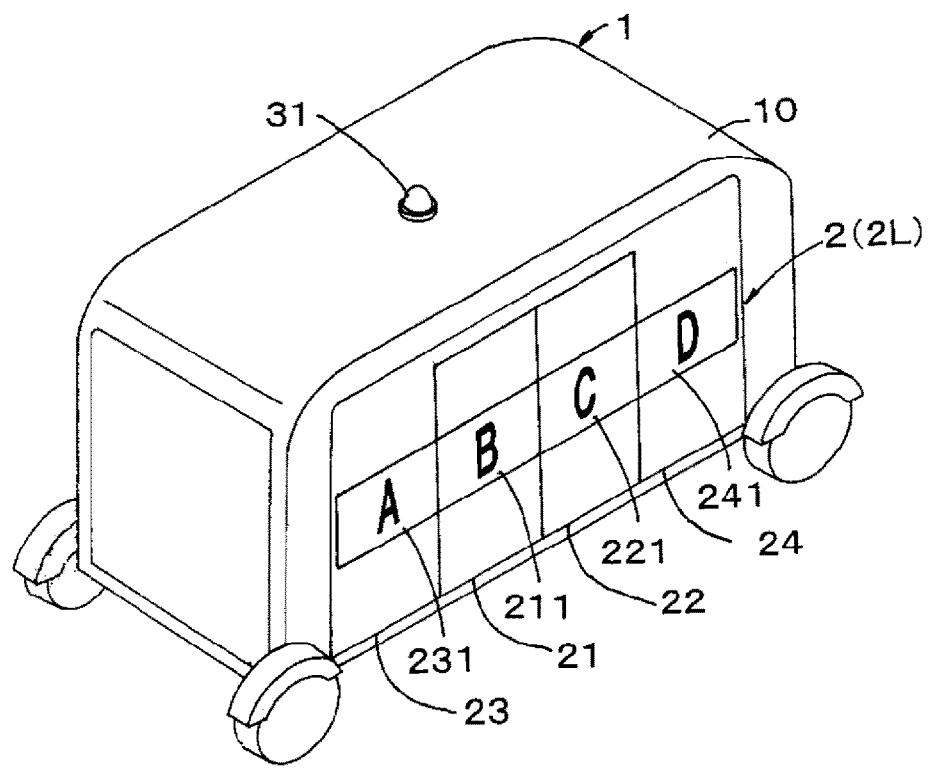
FIG. 21B is an external perspective diagram showing a display control form according to a modification of the seventh embodiment.

FIGS. 21A and 21B are schematic external diagrams of a first modification of the seventh embodiment, and portions equivalent to those of the seventh embodiment are denoted by the same reference numerals. In the first modification, as shown in FIG. 21A, the four display panels 21 to 24 arranged on the two slide doors 12 and the left side surface 13 sandwiching the slide doors 12 are each implemented by a low resolution panel. At the central area of the four display panels 21 to 24 in the upper-lower direction, high resolution panels 211, 221, 231, and 241 (hereinafter, 211 to 241) that are connected to each other in a band shape in the front-rear direction of the automatic driving vehicle 1 are configured.

In the first modification, when the viewer is far from the automatic driving vehicle 1, the image "ABCD" is also enlarged and displayed in the entire display area of the four display panels 21 to 24 on the left side surface, that is, in the entire display area including the high resolution panels 211 to 241 as shown in FIG. 21A. When the viewer is close, the image "ABCD" is reduced and displayed with high definition only on the high resolution panels 211 to 241 as shown in FIG. 21B. The viewer approaching the automatic driving vehicle 1 can visually recognize the reduced high-definition images displayed on the high resolution panels 211 to 241. The reduced image may be displayed only on one high resolution panel, for example, the high resolution panel 211.

In the first modification, since the high resolution panels 211 to 241 are arranged longer in the front-rear direction of the vehicle body of the automatic driving vehicle 1 than in the seventh embodiment, it is possible to collectively display a horizontally long image, for example, an image of a long character string. In addition, although the high resolution panels 211 to 241 are formed in a horizontally long shape in the first modification, the size (area) of the entire high resolution panels 211 to 241 can be reduced to be the same or less than that in the seventh embodiment by reducing the dimension of each high resolution panel in the upper-lower direction, and the cost can be reduced.

Eighth Embodiment

Figure 22A:
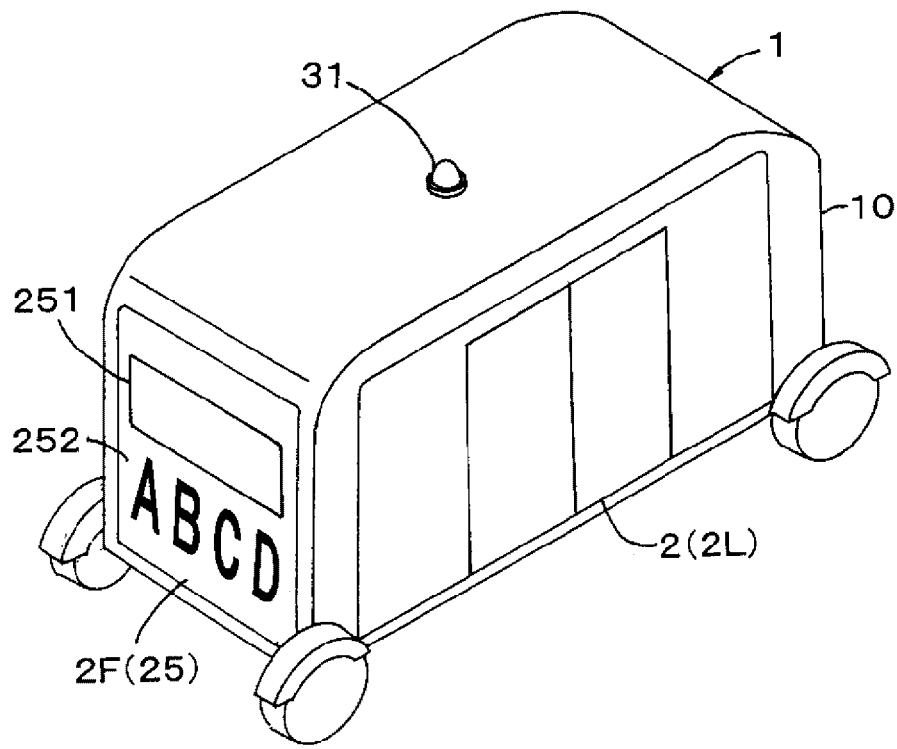
FIG. 22A is an external perspective diagram showing a display control form according to an eighth embodiment.
Figure 22B:
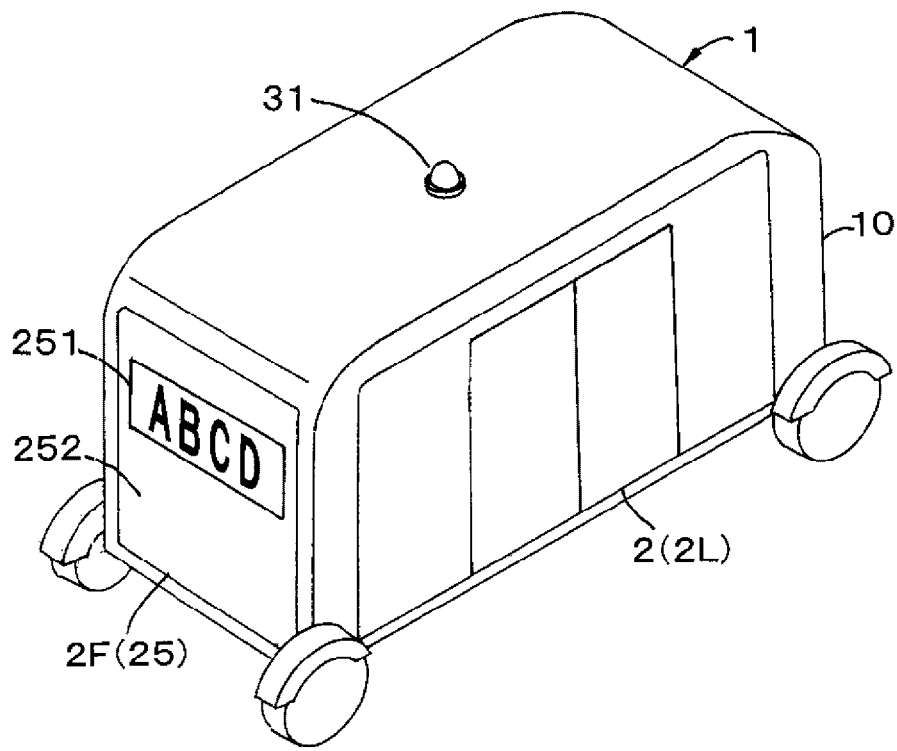
FIG. 22B is an external perspective diagram showing a display control form according to the eighth embodiment.

FIGS. 22A and 22B are schematic external diagrams of an eight embodiment, and portions equivalent to those of the seventh embodiment are denoted by the same reference numerals. In the eighth embodiment, as shown in FIG. 22A, the present disclosure is applied to the display panel 2F on the front side surface of the automatic driving vehicle 1. That is, the display panel 2F on the front side surface is implemented by the display panel 25 in which a high resolution panel 251 is arranged in a part of the display area near an upper side, and a low resolution panel 252 is arranged in a surrounding display area surrounding the high resolution panel 251.

In the eighth embodiment, when the viewer is far from the automatic driving vehicle 1, the image is enlarged and displayed in the display area of the low resolution panel 252 of the display panel 25 on the front side surface. In FIG. 22A, the display panel 25 displays the image "ABCD" on the low resolution panel 252 as large as possible. On the other hand, when the viewer is close to the automatic driving vehicle 1, as shown in FIG. 22B, the image "ABCD" is reduced and displayed on the display area of the high resolution panel 251.

For example, as shown in the seventh embodiment, when the bus formed by the automatic driving vehicle 1 is traveling at a position away from the bus stop, an image such as a destination of the bus is displayed in a large size over the entire surface of the low resolution panel 252, so that a passenger at the bus stop can visually recognize the image. When the bus comes close to the bus stop, the image is reduced and displayed with high definition on the high resolution panel 251. In addition, other information, for example, a bus number or the like is also displayed with high definition. A passenger can obtain information related to the bus by visually recognizing the high-definition image displayed on the high resolution panel 251. As a result, regardless of a difference in the distance between the automatic driving vehicle and the viewer, the viewer can visually recognize the displayed image reliably. At the same time, information on the cost of the display panel 2F on the front side surface can be reduced.

Although not shown in the drawings, the eighth embodiment may be applied to the display panel 2B on the rear side surface of the automatic driving vehicle 1. In this case, when the automatic driving vehicle is traveling and there is a following vehicle far away, an image is enlarged and displayed over the entire display area of the display panel 2B on the rear side surface. When the following vehicle is approaching, the image is reduced and displayed with high definition on a high resolution panel arranged on a part of the display panel 2B. Accordingly, regardless of a difference in the distance from the following vehicle, an occupant of the following vehicle can visually recognize the image displayed on the automatic driving vehicle reliably. At the same time, the display panel on the rear side surface can be configured at a low cost.

In the present disclosure, as in the seventh embodiment, when displaying an enlarged image, the enlarged image may be displayed over the entire display area of the display panels including both the high resolution panel and the low resolution panel. As in the eighth embodiment, the display may be performed only in the display area of the low resolution panel. In any case, when displaying an image on the high resolution panel, the image may be displayed so as to fall within the display area of the high resolution panel.

In the seventh embodiment and the eighth embodiment, the present disclosure may appropriately control the shape of an image to be displayed, the brightness (including the luminance, the color saturation, and the contrast) of the image in addition to the size of the image. In particular, when a viewer is far from the automatic driving vehicle, the present disclosure controls the size of the image to be displayed and controls the luminance and contrast of the image to be high. As a relative distance between the viewer and the automatic driving vehicle becomes shorter, the present disclosure may control the luminance and the contrast of the image to be lower.

The present disclosure may control an image to be displayed according to a traveling state of the vehicle without particularly detecting a viewer. For example, an image may be displayed over the entire display area of the display panel while the vehicle is traveling, and an image may be displayed in the display area of the high resolution panel when the vehicle stops. An occupant of the vehicle may control the display form of the image artificially while checking a situation around the automatic driving vehicle. In these cases, the viewer detecting portion in the display control unit according to the seventh embodiment can be omitted, and the configuration of the image control unit can be simplified.

The present disclosure is not limited to a display device of an automatic driving vehicle, and may be applied to a vehicle including a display panel in a vehicle body or a window of an automobile which is not an automatic driving vehicle. The display panel provided in the vehicle is not necessarily arranged on the four side surfaces of the vehicle body of the vehicle, and the present disclosure can be applied to a display panel that is already provided.

The present application claims priority from Japanese Patent Application No. 2018-220840 filed on Nov. 27, 2018, Japanese Patent Application No. 2018-220841 filed on Nov. 27, 2018, and Japanese Patent Application No. 2018-220842 filed on Nov. 27, 2018, the entire subject content of which is incorporated herein by reference.

The invention claimed is:

1. A vehicular display device comprising:
a plurality of display panel arranged on a vehicle body of a vehicle and configured to display an image; and
a CPU configured to control display of the image,
wherein the display panel includes a movable portion provided on the vehicle body,
wherein the CPU configured to control a display form of the image when the movable portion is operated,
wherein the CPU is configured to, when an image of one display panel is hidden and covered by another display panel due to an operation of the movable portion, display the image of the one display panel on the another display panel.

2. The vehicular display device according to claim 1, wherein the CPU is configured to, when the movable portion is operated, display an image different from an image displayed on the other display panel before the operation of the movable portion on the other display panel.

3. The vehicular display device according to claim 1, wherein the movable portion is a door or a window provided on the vehicle body, and wherein the CPU is configured to control a display form of the image based on an opening and closing operation of the door or the window.

4. The vehicular display device according to claim 3, wherein the CPU is configured to, when the door or the window is opened or closed, control a display form of an image on one display panel to be overlapped with the door or the window, and a display form of an image on another display panel arranged on the door or the window.

5. The vehicular display device according to claim 1, wherein the CPU is configured to detect an operation of the movable portion and control a display form of the image based on the detection output.

6. The vehicular display device according to claim 1, wherein the CPU is configured to control a size, a shape, and brightness of the image.

7. A vehicular display device comprising:
at least one display panel arranged on a vehicle body of a vehicle and configured to display an image; and
a CPU configured to control display of the image,
wherein the CPU is configured to:
detect a viewer who is around the vehicle and visually recognizes the image and a position of the viewer;
control the image according to the position of the viewer detected by the viewer detecting unit;
control a display form of the image in response to a change in the position of the viewer, and
display the image in a smaller size when a distance between the viewer and the vehicle is smaller than a reference distance than that when the distance is larger than the reference distance.

8. The vehicular display device according to claim 7, wherein the viewer includes a pedestrian, and wherein the CPU is configured to detect a pedestrian and another vehicle, and when the other vehicle is detected, determine whether the other vehicle is an autonomous driving vehicle or a non autonomous driving vehicle.

9. The vehicular display device according to claim 7, further comprising:
a projector configured to project an image onto a road surface around the vehicle, wherein the CPU is configured to control display forms between display of an image on the display panel and display of an image onto a road surface by the projector.

10. The vehicular display device according to claim 7, wherein the CPU is configured to control a size, a display position, a shape, and brightness of the image according to a change in a position of the viewer with respect to the vehicle.

11. The vehicular display device according to claim 10, wherein the CPU is configured to change a size of the image according to a distance between the vehicle and the viewer.

12. The vehicular display device according to claim 10, wherein the CPU is configured to change a display position of the image according to a change in a position of the viewer with respect to the vehicle.

13. The vehicular display device according to claim 10, wherein the CPU is configured to change a shape of the image according to a direction of the viewer with respect to the vehicle.

14. A vehicular display device comprising:
at least one display panel arranged on a vehicle body of a vehicle and configured to display an image,
wherein the display panel has a low resolution panel configured to display the image at a low resolution and a high resolution panel configured to display the image at a high resolution, and
wherein an image displayed in a display area including at least the low resolution panel is displayed in a display area of the high resolution panel,
wherein the high resolution panel is arranged in a part of a display area of the display panel, and the low resolution panel is arranged in a display area other than the high resolution panel.

15. The vehicular display device according to claim 14, wherein an image displayed over both display areas of the low resolution panel and the high resolution panel is reduced and displayed in the display area of the high resolution panel.

16. The vehicular display device according to claim 14, wherein an image displayed in the display area of the low resolution panel is reduced and displayed in the display area of the high resolution panel.

17. The vehicular display device according to claim 14, further comprising:
a CPU configured to control display of the image to be displayed on the display panel,
wherein the CPU is configured to:
detect a viewer who is around the vehicle and visually recognizes the image and a position of the viewer;
control the image according to the position of the viewer detected by the viewer detecting unit; and
control a display form of the image in response to a change in the position of the viewer.

18. The vehicular display device according to claim 17, wherein CPU is configured to change a size of an image according to a distance between the vehicle and the viewer, display the image in the display area including the low resolution panel when the distance is equal to or longer than a predetermined distance, and display the image in the display area of the high resolution panel when the distance is shorter than a predetermined distance.

* * * * *